(12) United States Patent
Betournay et al.

(10) Patent No.: US 11,788,894 B2
(45) Date of Patent: Oct. 17, 2023

(54) MONITORING GROUND ENGAGING PRODUCTS

(71) Applicant: ESCO GROUP LLC, Portland, OR (US)

(72) Inventors: Jason W. Betournay, Portland, OR (US); Noah D. Cowgill, Portland, OR (US); Steven D. Hyde, Portland, OR (US); Christopher M. Carpenter, Tualatin, OR (US); John M. Anderton, Portland, OR (US)

(73) Assignee: ESCO GROUP LLC, Portland, OR (US)

( * ) Notice: Subject to any disclaimer, the term of this patent is extended or adjusted under 35 U.S.C. 154(b) by 410 days.

(21) Appl. No.: 16/903,255

(22) Filed: Jun. 16, 2020

(65) Prior Publication Data

US 2020/0393303 A1 Dec. 17, 2020

Related U.S. Application Data

(60) Provisional application No. 62/862,625, filed on Jun. 17, 2019.

(51) Int. Cl.
| | |
|---|---|
| *G01J 5/10* | (2006.01) |
| *B64C 39/02* | (2023.01) |
| *B64D 47/08* | (2006.01) |
| *E02F 9/26* | (2006.01) |
| *G01N 25/72* | (2006.01) |
| *E02F 9/28* | (2006.01) |
| *G01J 5/00* | (2022.01) |
| *G01J 5/48* | (2022.01) |
| *B64U 10/13* | (2023.01) |
| *B64U 101/30* | (2023.01) |

(52) U.S. Cl.
CPC ............. *G01J 5/10* (2013.01); *B64C 39/024* (2013.01); *B64D 47/08* (2013.01); *E02F 9/26* (2013.01); *E02F 9/2808* (2013.01); *E02F 9/2833* (2013.01); *G01N 25/72* (2013.01); *B64U 10/13* (2023.01); *B64U 2101/30* (2023.01); *G01J 5/485* (2022.01); *G01J 2005/0077* (2013.01)

(58) Field of Classification Search
CPC .......... G01J 5/10; B64C 39/024; B64D 47/08; E02F 9/267; G01N 25/72
USPC .......................................................... 374/4
See application file for complete search history.

(56) References Cited

U.S. PATENT DOCUMENTS

| | | |
|---|---|---|
| 8,074,383 B2 | 12/2011 | McClanahan |
| 8,228,172 B2 | 7/2012 | Collins et al. |
| 8,890,672 B2 | 11/2014 | Miller |

(Continued)

FOREIGN PATENT DOCUMENTS

EP  3327205 A1  5/2018

*Primary Examiner* — Jeffery A Williams
(74) *Attorney, Agent, or Firm* — Steven Schad; Palmer Dzurella

(57) ABSTRACT

Apparatus and methods for detecting a characteristic of a ground engaging product on earth working equipment are described. The apparatus is operable to: measure a temperature profile at a ground engaging product location; compare the measured temperature profile with an expected temperature profile for that ground engaging product; and indicate a characteristic of the ground engaging product based on the comparison. Thermal inserts for use with ground engaging products on earth working equipment are also described.

12 Claims, 10 Drawing Sheets

(56) References Cited

U.S. PATENT DOCUMENTS

| | | | |
|---|---|---|---|
| 9,222,243 B2 | 12/2015 | Cheyne et al. | |
| 9,561,562 B2 | 2/2017 | Churchill | |
| 10,011,975 B2 | 7/2018 | Carpenter et al. | |
| 2016/0237640 A1* | 8/2016 | Carpenter | E02F 9/2833 |
| 2017/0321396 A1 | 11/2017 | Zenier et al. | |
| 2018/0130222 A1 | 5/2018 | Tafazoli Bilandi et al. | |
| 2019/0153703 A1 | 5/2019 | Hyde et al. | |

* cited by examiner

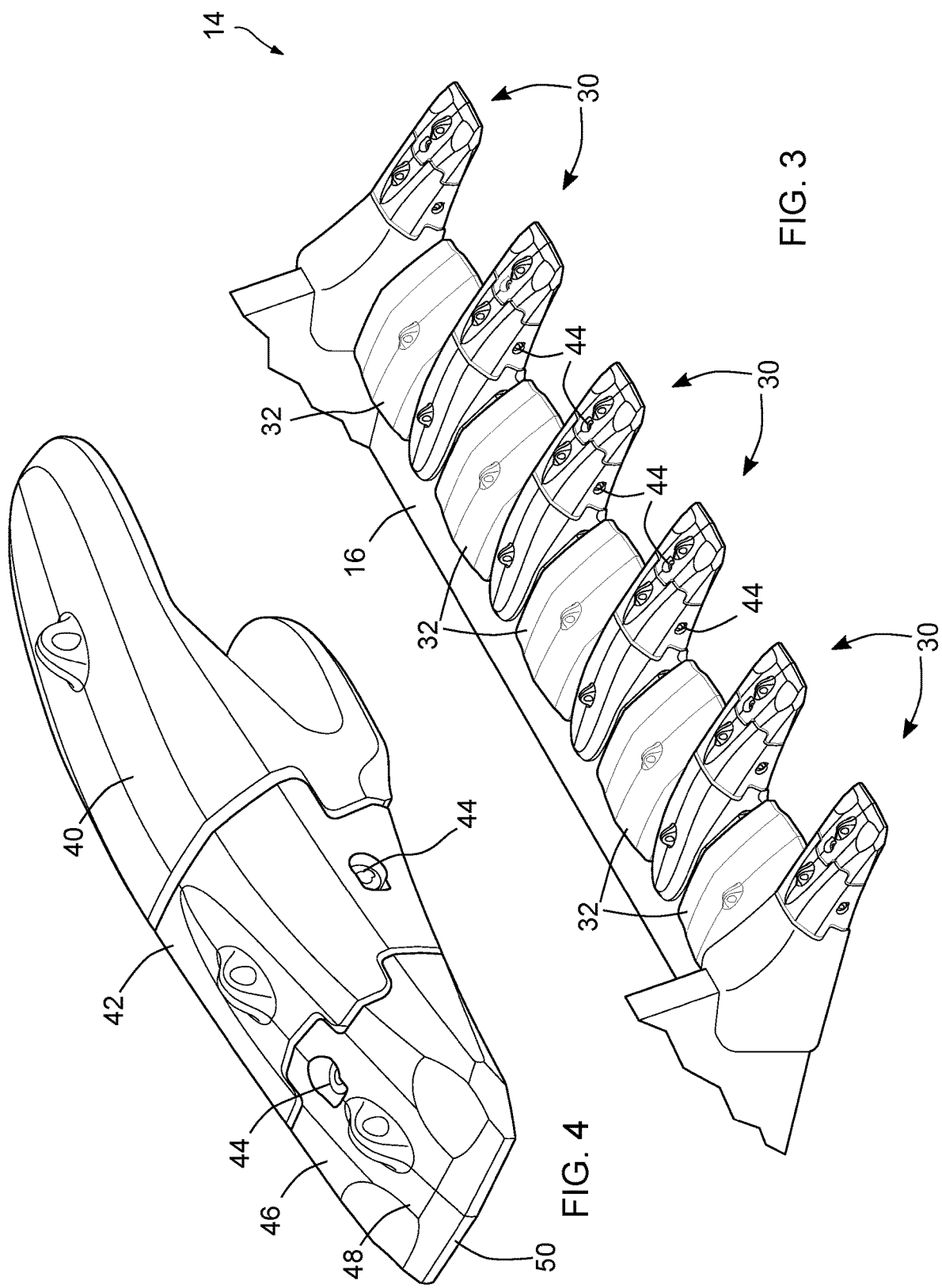

MONITORING GROUND ENGAGING PRODUCTS

FIELD OF THE INVENTION

The present invention pertains to monitoring ground engaging products, such as those used on earth working equipment.

BACKGROUND OF THE INVENTION

In various kinds of earth working activities (e.g., mining and construction), ground engaging products (e.g., teeth and shrouds) are commonly provided on earth working equipment to protect the underlying equipment from undue wear and, in some cases, perform other functions such as breaking up the ground ahead of a digging edge. For example, excavating buckets are typically provided with wear components such as teeth and/or shrouds that are attached to the lip of the bucket.

During use, such ground engaging products can encounter heavy loading and highly abrasive conditions. These conditions can cause the products to wear and/or become separated from the earth working equipment. For example, as a bucket engages the ground, a point or shroud may become separated from the digging edge. The operators of the earth working equipment may not always be able to see when such products have separated from the bucket. Continuing to operate the earth working equipment with missing wear parts can lead to a decrease in production and excessive wear on other components on the earth working equipment. A lost wear part in a mining environment can cause damage to downstream equipment (e.g., conveyors, screens, pumps, crushers, etc.), which may, in turn, lead to unscheduled downtime of the equipment and loss of production. If a wear part becomes caught in a crusher, the wear part may be ejected and cause a hazard to workers or it may be jammed and require an operator to dislodge the part, which at times may be a difficult, time-consuming and/or hazardous process.

SUMMARY OF THE INVENTION

Aspects of present invention may relate to a system, product, or apparatus for monitoring earth working equipment, and particularly for monitoring wear and/or loss of ground engaging products on earth working equipment used, for example, in mining and construction.

According to a first aspect there is provided apparatus for monitoring a ground engaging product on earth working equipment, the apparatus being operable to: measure a temperature profile at a ground engaging product location; compare the measured temperature profile with an expected temperature profile for that ground engaging product; and indicate a characteristic of the ground engaging product based on the comparison.

The apparatus may comprise a single housing enclosing the components therein, or it may comprise a plurality of components physically separated and located in different housings; for example, the apparatus may comprise a physically distributed group of interconnected components.

Optionally, the apparatus measures the temperature profile using a thermal imaging camera, an infrared sensor, a scanning laser beam and infrared sensor, or any other convenient thermal detection device. Optionally, the apparatus includes a plurality of thermal imaging cameras.

Optionally, the expected temperature profile for that ground engaging product may comprise the temperature profile for another ground engaging product mounted on the same earth working equipment as the measured temperature profile. A temperature profile may be measured for each ground engaging product on that equipment, and the temperature profiles may be compared to identify any ground engaging product having an elevated temperature profile. This may indicate that the ground engaging product having the higher temperature profile is experiencing greater wear, which may, for example, be due to the hardness of the rock or earth that it is impacting.

Optionally, the apparatus comprises a power source, such as a battery, which may be rechargeable.

Optionally, the apparatus comprises a transceiver for communicating with remote computers.

Optionally, the apparatus includes an adjustable stand to allow the monitoring device to be moved to change the field of view of the thermal imaging camera(s).

Optionally, the apparatus further comprises an attenuation characterization module. The attenuation characterization module may include a laser that can point at, and impinge on, a surface of a thermal insert, wherein the intensity of the measured reflection provides data on the particle density between the attenuation characterization module and the thermal insert surface. Alternatively or additionally, the attenuation characterization module may receive a calibrated emission from an emitter in a thermal insert, and may use this calibrated emission to estimate the particle density between the attenuation characterization module and the thermal insert surface.

Optionally, the apparatus includes a high definition (HD) camera to capture an image of the ground engaging product for use in creating an outline of the ground engaging product onto which a thermal image from the thermal image camera(s) may be mapped.

In some embodiments, the thermal image may be processed by utilizing the detected edges (or outlines) to make a decision on condition or presence of parts (or all) of a ground engaging product.

In some embodiments, a neural network or other machine learning algorithm may process the entire component representation (one of the ground engaging products or the whole set of ground engaging products) to make a decision on condition or presence of parts (or all) of a ground engaging product.

Optionally, the apparatus comprises an ultra-violet (UV) radiation camera. The UV camera may be combined with the HD camera to have a detection range from the ultra-violet region of the electromagnetic spectrum to near infra-red. The apparatus may also include an excitation source (for example, a UV light source) to stimulate fluorescence or another form of photoluminescence. The fluorescence or other form of photoluminescence may be detected by the UV camera (or combined UV HD camera).

Optionally, the apparatus compares the measured temperature profile with an expected temperature profile by accessing stored measurements relating to expected use of the ground engaging product.

Optionally, the apparatus compares the measured temperature profile with an expected temperature profile by identifying a presence or absence of a temperature change between adjacent locations on the ground engaging product.

Optionally, the apparatus creates a difference profile as a result of the comparison.

Optionally, the characteristic comprises one or more of: (i) presence of the ground engaging product, (ii) absence of the ground engaging product, (iii) excessive wear of the ground engaging product, or (iv) a crack, hole, or other deformity of the ground engaging product. Characteristics (ii) to (iv) above may be referred to as a defect characteristic.

The apparatus may comprise a monitoring device. The monitoring device may include a single housing enclosing the components therein, or it may comprise a plurality of components physically separated and located in different housings; for example, the monitoring device may comprise a physically distributed group of interconnected components.

According to a second aspect there is provided a method of ascertaining a characteristic of a ground engaging product on earth working equipment, the method comprising the steps of: (i) measuring a temperature at a plurality of different locations on or near the earth working equipment, including at least one location on the ground engaging product; (ii) identifying presence or absence of areas of temperature contrast near a location of an expected thermal insert; and (iii) indicating a characteristic of the ground engaging product based on the identified areas.

The step of measuring a temperature at a plurality of different locations may include creating a thermal map of at least part of the ground engaging product. The thermal map may be created by a thermal imaging camera or by combining outputs from a thermal detector.

The step of identifying presence or absence of areas of temperature contrast near a location of an expected thermal insert may include using one or more markers or other indicators to align with areas of expected temperature contrast. The one or more markers or other indicators may be overlaid on a thermal map to highlight areas of expected temperature contrast.

The step of indicating a characteristic of the ground engaging product based on the identified areas may include classifying an amount of wear on the ground engaging product into a plurality of categories. The plurality of categories may include: light wear, medium wear, heavy wear, and missing part.

The step of indicating a characteristic of the ground engaging product based on the identified areas may include generating an alert when the wear exceeds a defined level. The defined level may be heavy wear or missing part.

The step of generating an alert may include generating a visual, tactile, or audible alert.

The step of measuring a temperature at a plurality of different locations on or near the earth working equipment, may include measuring a temperature at a plurality of different ground engaging products; and the method may include the further step of comparing a temperature profile for one of the ground engaging products with a temperature profile of another ground engaging product, where the temperature profile is measured for each ground engaging product on that equipment, and the temperature profiles are compared to identify any ground engaging product having an elevated temperature profile. This may indicate that the ground engaging product having the higher temperature profile is experiencing greater wear, which may, for example, be due to the hardness of the rock or earth that it is impacting.

According to a third aspect there is provided a thermal insert for use with a ground engaging product to create a temperature contrast therein, the thermal insert comprising: a target area and having first thermal properties; and a mount extending from a lower part of the target area for insertion into the ground engaging product.

The target area may define an outer surface. A thermal camera may be used to detect the outer surface. In some embodiments, the target area may include an inner surface that can be detected by a thermal camera. The inner surface may be covered by a material substantially transparent to infra-red radiation.

The thermal insert may comprise an insulating layer surrounding an edge of the outer surface, the target area, or an edge of the mount.

The thermal insert may comprise a plurality of components. The components may include one or more of the following: a power source (such as a battery), a thermal unit for heating or cooling part or all of the thermal insert, a thermal emitter for emitting a known signal for use in locating or calibrating the thermal insert, an accelerometer, a controller for managing the operation of these components, a transceiver for supporting wireless communications with remote devices, and a temperature sensor for measuring a temperature at or near the thermal insert.

The power source may be rechargeable, in which case a charging unit (such as one or more piezoelectric components) may be provided.

The target area may comprise a central portion and a periphery and a thickness of the target area may reduce from the central portion towards a periphery of the target area. The target area may taper (e.g. from a relatively thick center to a relatively thin periphery), or the target area may have a convex cross section. By having the periphery of the target area thinner than the central portion, the target area is likely to reduce in diameter in the presence of uniform erosion, which may be more easily detected by the monitoring device.

The mount may comprise a threaded stud, a stem, or other portion extending from the target area. The mount may be secured to an insert aperture using a threaded engagement, an interference fit, complementary engaging portions, a mechanical coupling, adhesive, welding, or the like.

The mount may have the same, or similar, thermal properties to the first thermal properties, and it may narrow as it extends away from the target area. For example, the mount may be tapered, or decrease in width in a stepped manner.

In some embodiments, there may not be any mount extending from the target area, and no insert aperture. In such embodiments, the target area may be glued, welded, or otherwise fixed to a surface of a ground engaging product, or part thereof.

The thermal insert may include fluorescent (or other form of photoluminescent) material, such as a fluorescent substance or a fluorescent paint covering the target area.

According to a fourth aspect there is provided a ground engaging product comprising an exterior surface and a thermal insert partly located within the exterior surface, and providing an externally visible outer surface, where the outer surface has a thermal conductivity differing from a thermal conductivity of the exterior surface.

The ground engaging product may have a front portion for engaging with earth (or a tip) and a rear portion.

The exterior surface may define a mounting aperture and a thermal insert partly located within the mounting aperture and secured thereto.

The externally visible outer surface may be visible from above or to one side of the ground engaging product.

The outer surface may have a thermal conductivity differing from a thermal conductivity around the mounting aperture.

The front portion may define the mounting aperture.

The thermal insert and/or the mounting aperture sidewall(s) may include a thermal insulator to reduce thermal transfer from the insert outer surface to the front portion.

The thermal insert may define a thermally insulated layer surrounding the side(s) and lower surface of the outer surface thereby preventing or reducing thermal transfer between the outer surface and other parts of the thermal insert and surrounding areas of the ground engaging product.

A power source (such as a battery) may be provided to provide heat or cooling to the thermal insert (such as the outer surface thereof), and/or the front portion.

According to a fifth aspect there is provided a lock for holding a portion of a ground engaging product in place on earth working equipment, the lock comprising: an exterior surface having lateral engaging formations for engaging with complementary formations in the ground engaging product; an outer surface including at least one insert having first thermal properties differing from thermal properties of areas around the insert.

The outer surface may comprise an upper surface when the lock is in use.

According to a sixth aspect there is provided a monitoring device for detecting a characteristic of a ground engaging product on earth working equipment, the monitoring device being operable to: measure a temperature differential at a ground engaging product location; compare the measured temperature differential with an expected temperature differential for that ground engaging product to create a difference profile; and indicate a characteristic of the ground engaging product based on the difference profile.

The characteristic (in this and other aspects) may comprise presence, absence, a wear state (e.g. high, medium, or low wear), or other condition (presence of cracks, holes, fissures, deformity, or the like) of a ground engaging product.

According to a seventh aspect there is provided monitoring apparatus for detecting a characteristic of a ground engaging product on earth working equipment, the monitoring apparatus comprising a thermal detector operable to measure a temperature at a plurality of different locations on or near the earth working equipment, including at least one location on the ground engaging product, and a processor operable to identify presence or absence of areas of temperature contrast near a location of an expected thermal insert, and to identify a characteristic of the ground engaging product based on the identified areas.

The monitoring apparatus may comprise a plurality of thermal detectors. Each thermal detector may be coupled to the processor. The plurality of thermal detectors may be located within a housing of the monitoring apparatus, or may be located in separate housings. Two or more of the thermal detectors may be directed at different parts of the ground engaging product.

According to an eighth aspect there is provided a method for validating installation of parts of a ground engaging product set, the method comprising: capturing a thermal image of the ground engaging product set; identifying individual ground engaging products comprising the set; comparing the identified ground engaging products with an expected set of ground engaging products; and reporting a match result based on the comparison.

The match result may comprise a successful match, indicating that the expected ground engaging product set matches the identified ground engaging products; or a failed match, indicating that the expected ground engaging product set does not match the identified ground engaging products.

In the event of a failed match, the method may include the further step of indicating what ground engaging products from the expected set have not been detected.

In the event of a successful match, the method may include the further step of transmitting an indication of the successful match to a remote device. The method may include the further step of closing an open ticket relating to installation of the ground engaging product set in response to receipt of the successful match notification.

This aspect may be used for validating successful commissioning and decommissioning of ground engaging products, and also for providing positional data of a ground engaging product that has been installed.

According to a ninth aspect there is provided an unmanned aerial vehicle including monitoring apparatus according to the first, sixth or seventh aspects above and operable to fly above earth working equipment to provide the monitoring apparatus with a line of sight view of ground engaging products to be monitored.

In one embodiment, the monitoring apparatus uses thermal differentiation to determine wear and/or loss of a wear part.

In another embodiment, the monitoring apparatus detects wear and/or loss of a ground engaging product on earth working equipment by detecting the presence and/or absence of one or more thermal insert in the product, which has a different temperature during operation of the equipment compared with the body of the product.

In another embodiment, the monitoring apparatus detects wear or loss of a ground engaging product on earth working equipment by detecting the temperature difference between the product and the earthen material being worked.

In another embodiment, the monitoring apparatus includes a thermal camera or infrared device to monitor wear parts on earth working equipment.

In another embodiment, a monitoring system includes a monitoring device to detect the temperatures associated with one or more wear parts with or without thermal inserts and/or its working environment during an earth working operation, and a display in the cab, service vehicle, office and/or elsewhere to visually show the level of wear in the wear part(s) and/or the presence or absence of the wear parts.

In another embodiment, a monitoring system includes a monitoring device to detect the temperatures associated with one or more wear parts with or without thermal inserts and/or its working environment during an earth working operation, and a programmable logic device to receive data from the monitoring device and determine when a wear part has worn beyond a predetermined limit and/or is absent and provide an alert to the machine operator, maintenance worker, supervisor and/or other person.

In another embodiment, the system includes an attenuation device that characterizes airborne particles to determine attenuation of a signal measured by a thermal device.

In another embodiment, one or more thermal insert is provided in a ground engaging product for earth working operation that will have a different temperature than the body of the wear part during an earth working operation.

According to a tenth aspect there is provided monitoring apparatus for detecting a characteristic of a ground engaging product on earth working equipment, the monitoring apparatus comprising a thermal detector operable to measure a temperature at a plurality of different locations on or near the earth working equipment, including at least one location on the ground engaging product, and a processor operable to identify presence or absence of areas of temperature contrast near or at a location of the ground engaging product to identify a characteristic of the ground engaging product based on the identified areas.

The processor may be operable to identify presence or absence of areas of temperature contrast by comparing measurements of a current thermal image of the ground engaging product with measurements of a previously recorded thermal image of the ground engaging product, and detecting any reduction in size of part of the ground engaging product.

The presence or absence of areas of thermal contrast may be recorded near a location of an expected thermal insert.

The monitoring apparatus may comprise a plurality of thermal detectors. Each thermal detector may be coupled to the processor. The plurality of thermal detectors may be located within a housing of the monitoring apparatus, or may be located in separate housings.

According to an eleventh aspect there is provided a method of ascertaining a potential high wear area of ground engaging products on earth working equipment, the method comprising the steps of: (i) measuring a temperature at a plurality of different ground engaging products on the earth working equipment over a period of time to create a temperature profile for each ground engaging product; (ii) comparing the temperature profiles to identify an elevated temperature profile compared with at least one other temperature profile; and (iii) indicating a potential high wear area corresponding to the ground engaging product having the elevated temperature profile.

The relative temperature between different ground engaging products can correlate to relative wear rate of those ground engaging products (higher temperature indicates a higher probability of wear). A difference in temperature between a ground engaging product (e.g. a shroud or a tip) and ambient (e.g. the air temperature) may indicate the rate of wear of the ground engaging products.

The method may include generating an alert when the potential high wear area meets a defined criterion. The defined criterion may be heavy wear or missing part.

Alternatively, or additionally, the defined criterion may be when the temperature profiles of ground engaging products on one part of a lip (for example, a right side) exceed the temperature profiles of ground engaging products on another part of a lip (for example, a central portion, or a left side). This may indicate a bias to one side or the other due to the earth or rocks being excavated, which may give rise to uneven wear on the ground engaging products, and also non-centered loading on the bucket and earth working machine.

The step of generating an alert may include generating a visual, tactile, or audible alert.

According to a twelfth aspect there is provided a method of ascertaining strain on a lip secured to a bucket due to unbalanced loads, the method comprising the steps of: (i) measuring a temperature at a plurality of different ground engaging products on the lip over a period of time to create a temperature profile for each ground engaging product; (ii) comparing the temperature profiles to identify an elevated temperature profile compared with at least one other temperature profile; and (iii) indicating potential strain on the lip at an area where the ground engaging product having the elevated temperature profile is secured.

The step of comparing the temperature profiles to identify an elevated temperature profile compared with at least one other temperature profile may include identifying rising temperature profiles of the ground engaging products towards one side of the lip.

Rising temperature profiles of the ground engaging products may indicate that those ground engaging products are subject to more heat than the other ground engaging products. This may be caused by higher friction due to higher loads on those ground engaging products.

According to a thirteenth aspect there is provided apparatus for monitoring a ground engaging product, the apparatus comprising a thermal sensor external to the ground engaging product and being operable to measure a temperature at the ground engaging product location; and a processor operable to: (i) compare the measured temperature with an expected temperature for that ground engaging product, and (ii) indicate a characteristic of the ground engaging product based on the comparison.

The monitoring apparatus may be spaced apart from the ground engaging product and may define a field of view that includes the ground engaging product.

The characteristic may any characteristic described above with respect to other aspects.

The ground engaging product may be part of a set of ground engaging products mounted on earth working equipment.

As used herein, a temperature profile may comprise temperatures measured over a time period (a temporal temperature profile), temperatures measured over a physical area (a spatial temperature profile), or a mix of the two. For example, a temperature profile may comprise a temperature measured at a single point over a period of time (e.g. sampled at regular or irregular time intervals over a period of time), temperatures measured over a physical area (e.g. a tip, a shroud, an adapter, or the like) over a period of time, or temperatures measured over a physical area in a relatively short time period (e.g. over a length of a tip, intermediate adapter, and adapter; or over an area including a thermal insert so that one or more interfaces between the thermal insert and another material (metal, alloy, air, or the like) are measured as part of the profile).

Individual temperature measurements may be averaged, aggregated, interpolated, extrapolated, or otherwise processed to create the temperature profile.

The various above-noted aspects and embodiments are usable together or independently. To gain an improved understanding of the advantages and features of the invention, reference may be made to the following descriptive matter and accompanying figures that describe and illustrate various configurations and concepts related to the invention. Reference to "a" or "an" element, structure, feature, step, or the like means at least one such element, structure, feature, step or the like.

BRIEF DESCRIPTION OF THE DRAWINGS

FIG. 3 is a perspective view showing in more detail the ground engaging products (teeth and shrouds) mounted on the lip of FIG. 2.

FIG. 4 is a perspective view of one of the teeth shown in FIGS. 2 and 3.

DETAILED DESCRIPTION OF PREFERRED EMBODIMENTS

Figure 1:
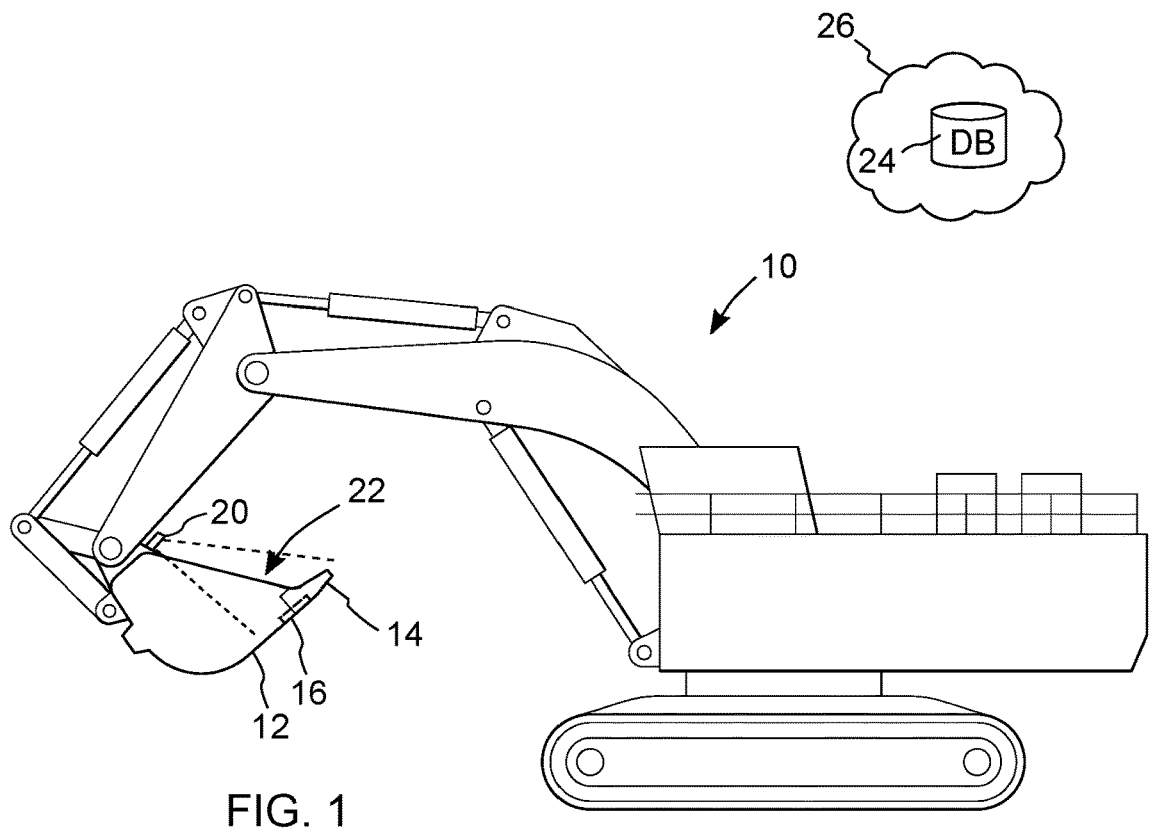
FIG. 1 is a side view of an earth working machine including a bucket having a monitoring device and ground engaging products secured thereto, according to one embodiment of the invention.

Reference is first made to FIG. 1, which is a side view of an earth working machine 10 according to one embodiment of the invention. The earth working machine 10 is a mining excavator for gathering earthen material while digging. The earth working machine 10 includes a bucket 12. Ground engaging products 14 are mounted on a lip 16 (shown in broken line in FIG. 1) that is secured to the bucket 12, typically by welding but other coupling techniques may be used. A monitoring device (also referred to as monitoring apparatus) 20 is mounted on an upper portion of the bucket 12 and has a visual field of view 22 (shown in broken line in FIG. 1) covering the ground engaging products 14.

In this embodiment, the monitoring device 20 includes a thermal imaging camera, but in other embodiments different thermal sensors may be used, such as a laser thermal sensor. In this embodiment, the monitoring device 20 comprises a single housing containing various components, but in other embodiments the monitoring device may comprise a distributed device, where the components are separated from one another, optionally located in different housings, and mutually communicate using wired or wireless connections.

The field of view 22 shown in FIG. 1 is given by way of example, but in some embodiments the field of view may be just large enough to cover all (or even just some) of the ground engaging products 14.

FIG. 1 also shows a remote database 24 located in a cloud computing environment 26, which is in communication with the monitoring device 20. The remote database 24 may be in communication with a large number of monitoring devices located at the same site or at multiple different sites.

Figure 2:
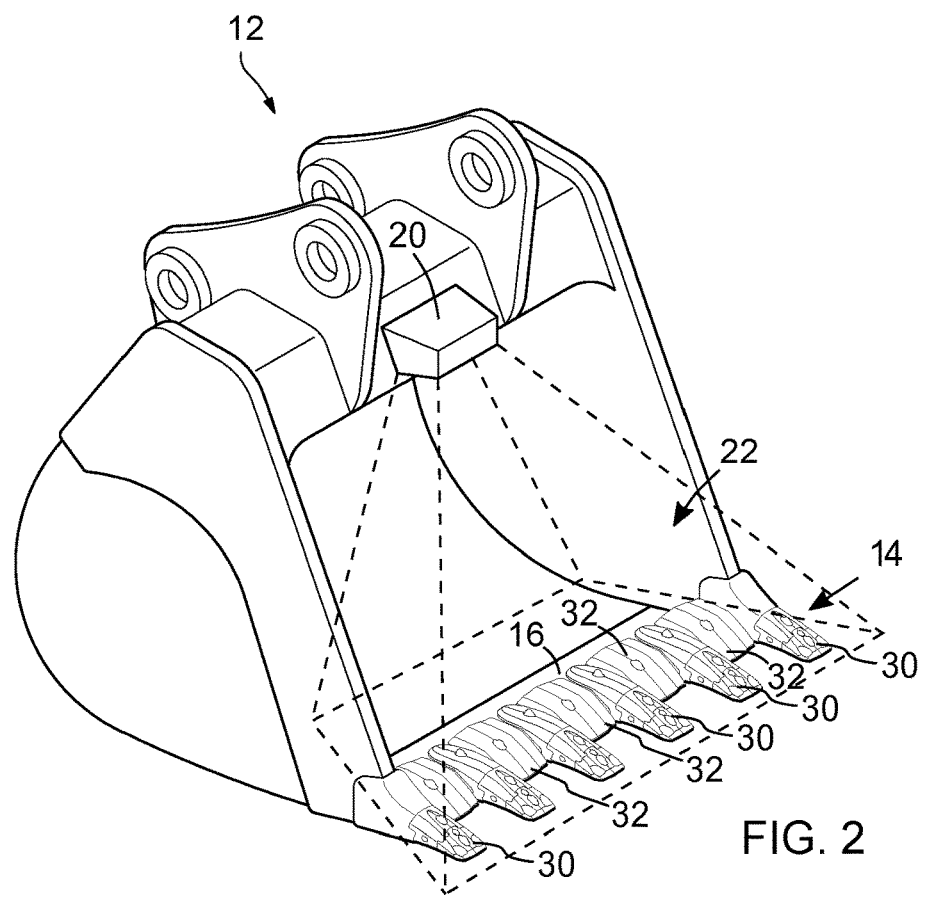
FIG. 2 is a perspective view of the bucket of FIG. 1, showing parts thereof (ground engaging products mounted on the lip) in more detail.

Reference is now also made to FIG. 2, which shows the bucket 12 in more detail. It should be appreciated that although one particular type of bucket is illustrated, the teachings herein can be applied to any type or style of bucket that uses ground engaging products (e.g. a dragline bucket, a shovel, or the like).

As shown in FIG. 2, the bucket 12 comprises ground engaging products 14 comprising alternating teeth 30 and shrouds 32. The teeth 30 and shrouds 32 are modified versions of the teeth and shrouds disclosed in U.S. Pat. No. 9,222,243 and US Patent Application 2017/0321396, which are each incorporated herein by reference in their entirety.

Figure 5:
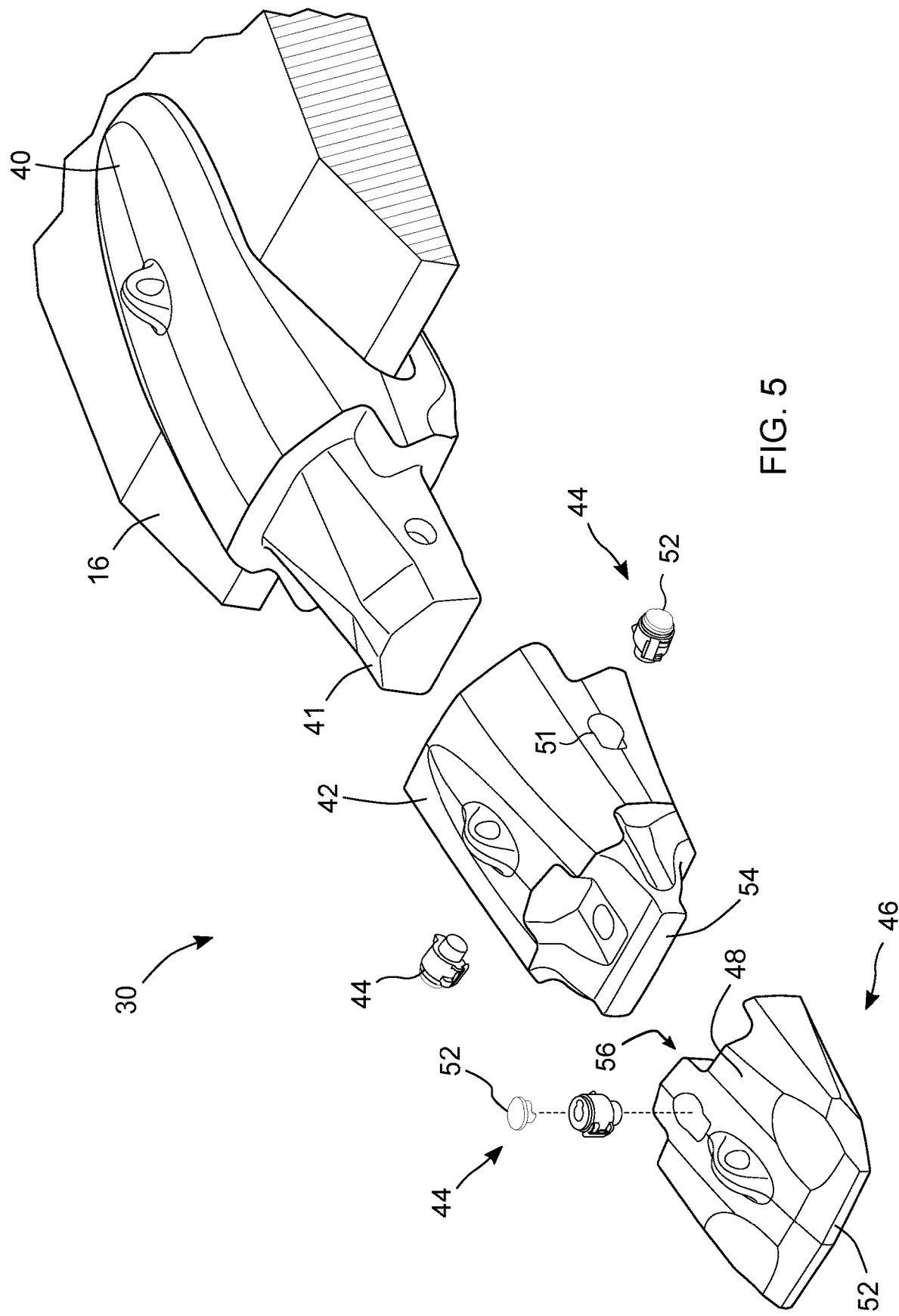
FIG. 5 is an exploded perspective view of the tooth shown in FIG. 4, illustrating locks for coupling the tooth together.

As best seen in FIGS. 3 to 5, each tooth 30 comprises an adapter 40 coupled (typically welded but mechanical couplings may be used) to the lip 16 and having a protruding nose 41, an intermediate adapter 42 coupled to the adapter 40 by one or more locks 44, and a tip (also called a point) 46 coupled to the intermediate adapter 42 (in this embodiment by a single lock 44 centrally located on an upper surface 48 of the tip 46). Two locks 44 are used on the intermediate adapter 42 in this embodiment, one on either side, but only one lock may be used in other embodiments, and the lock or locks may be mounted on other locations than those shown.

The tip 46 includes a front end 50, typically hardened or made from abrasion resistant material, to penetrate the ground. The teeth 30 engage with the ground and break it up to allow fragmented portions of the ground to be collected in the bucket 12. The intermediate adapter 42 and the tip 46 (and also the shroud 32) may be referred to individually as a wear member, as each wears away during use due, at least in part, to abrasion by the ground being penetrated and broken up.

The intermediate adapter 42 defines a front face 54 that engages with a wall (not shown) within a cavity 56 defined by the tip 46.

The locks 44 are similar to some conventional locks, such as those described in U.S. Pat. No. 9,222,243, which is incorporated herein by reference in its entirety. However, the main difference is that locks 44 include thermal inserts 52. These thermal inserts 52 have thermal properties that enable them to be distinguished from the surrounding material in the intermediate adapter 42 and the tip 46 by the monitoring device 20 based on their relative temperatures.

The particular size, shape and configuration of the thermal inserts 52 are not critical, provided the monitoring device 20 can detect them during operation of the earth working machine 10.

The reason that different thermal properties can be detected is that the friction associated with the force and abrasion of an earth working operation causes the ground engaging products 30, 32 to heat up relative to the surrounding environment. The monitoring device 20 can monitor the field of view 22, which includes the ground engaging products 30, 32 and capture a thermal image of the ground engaging products 30, 32.

The thermal inserts 52 may be passive or active. Passive thermal inserts do not typically include any power source. They comprise materials having different thermal properties from the surrounding material (in this embodiment the intermediate adapter 42 and tip 46), and rely on this difference giving rise to different temperatures of the thermal inserts and the surrounding materials which can be detected by the monitoring device 20 during operation of the earth working machine 10.

Passive thermal inserts 52 have the advantage of not requiring any power supply for their operation; however, it may be challenging to detect a passive insert prior to operation of the earth working machine 10, when the ground engaging products 30, 32 and the passive thermal inserts 52 may all be at the same ambient temperature.

Figure 6:
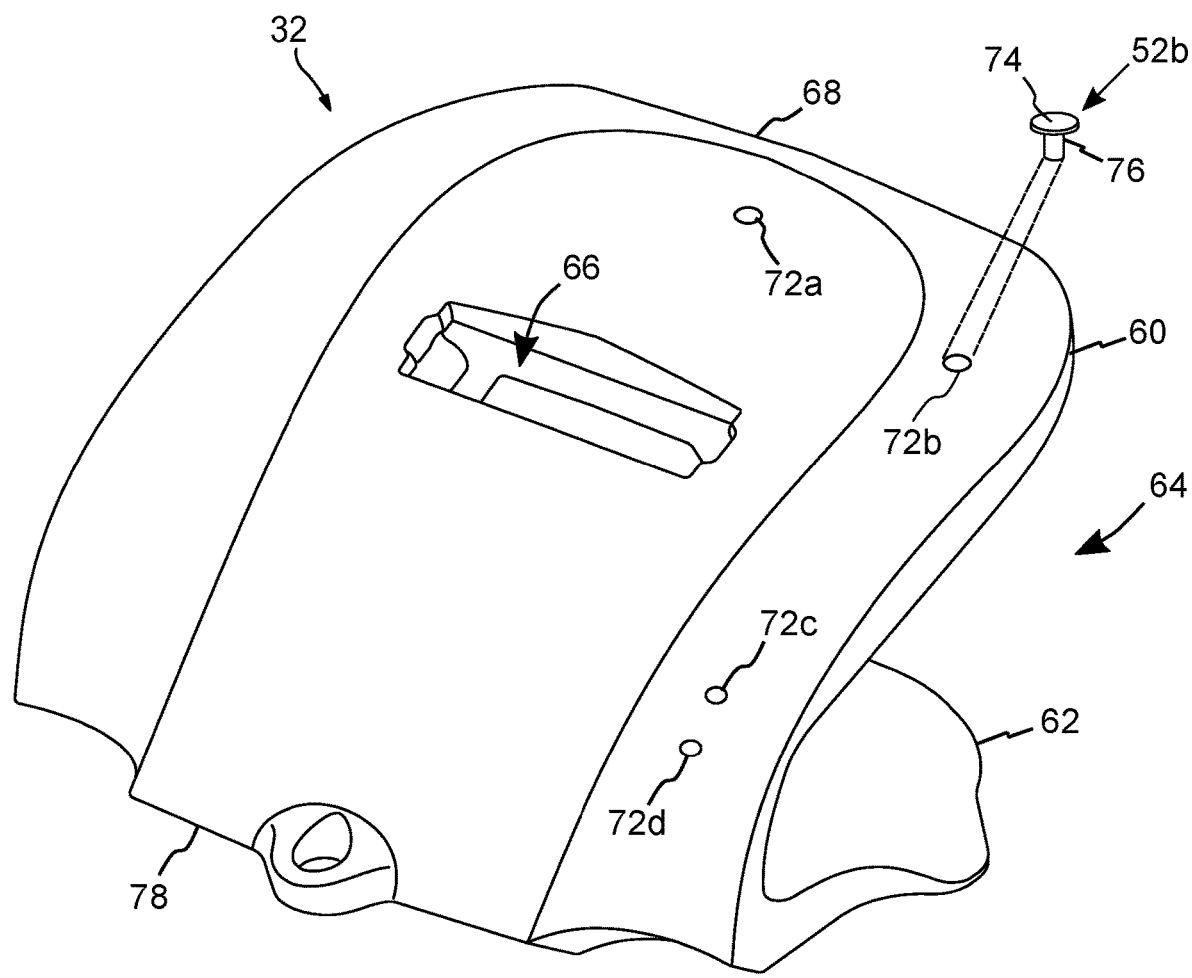
FIG. 6 is a perspective view of one of the shrouds shown in FIGS. 2 and 3 including thermal inserts.

One example of a passive thermal insert 52 is illustrated in FIG. 6, which is a perspective view of one of the shrouds 32 shown in FIGS. 2 and 3 configured to receive four identical passive thermal inserts 52, although a greater or fewer number of passive thermal inserts 52 may be used, different shapes and designs of passive thermal inserts may be used, or passive thermal inserts 52 may be combined on the same wear member as active thermal inserts. Although a shroud 32 is illustrated, similar configurations of thermal inserts may be used in other wear members such as tips, intermediate adapters, and adapters.

Shroud 32 includes upper and lower legs 60, 62 that diverge to define a rearwardly opening cavity 64 that receives the front edge of lip 16 (FIGS. 2 and 3). The upper leg 60 defines an aperture 66 that receives a folding lock 120 (shown in FIGS. 10 and 11) that secures the shroud 32 to the lip 16 to prevent release of the shroud 32 from the lip 16. The upper leg 60 defines an upper rear edge 68. Other shroud constructions are possible.

Shroud 32 differs from conventional shrouds of a similar type in that the upper leg 60 defines four insert apertures 72a,b,c,d (which may extend only partially or entirely through the upper leg 60). The insert apertures 72 are identical in this embodiment, but in other embodiments more than one size or shape of insert aperture may be used, and more or fewer than four insert apertures 72 may be used. In this embodiment, the insert apertures 72 are formed during casting of the shroud 32, but in other embodiments they may be drilled into, or otherwise formed in, the shroud 32 (or other wear part) subsequent to casting. In this embodiment the apertures 72 are circular, but other shapes are possible.

Each insert aperture 72 is tapped to create a thread formation for receiving a corresponding threaded portion. One of the passive thermal inserts 52 is illustrated in FIG. 6 and comprises an upper target area 74 that extends beyond the edge (or edges) of the insert aperture 72, and a threaded stud 76 extending from a lower, central portion of the upper target area 74. The threaded stud 76 screws into one of the insert apertures 72 and presents the upper target area 74 as an outer surface visible from above and from the front of the shroud 32. In this embodiment, the upper target area 74 has a thickness that reduces from the central portion towards a periphery of the upper target area 74. For example, the upper target area 74 may taper from a relatively thick center to a relatively thin periphery, or the upper target area 74 may have a convex cross section. The area around the insert aperture 72 may have a corresponding recess (such as a tapered recess or a concave shape). By having the periphery of the upper target area 74 thinner than a central portion, the upper target area 74 is likely to reduce in diameter in the presence of uniform erosion, which may be more easily detected by the monitoring device 20 (as described in more detail below).

In other embodiments, instead of a threaded stud 76, the stud or other portion extending from the upper target area 74 may be secured to the insert aperture 72 using a different securing mechanism, such as an interference fit, complementary engaging portions, a mechanical coupling, adhesive, welding, or the like. In other embodiments, there may not be any stud or other portion extending from the upper target area 74, and no insert aperture 72. In such embodiments, the upper target area 74 may be glued, welded, or otherwise fixed to a surface of the shroud 32. In this embodiment, the intermediate adapter 42 and tip 46 comprise steel and the passive thermal insert 52 comprises a composite of tungsten carbide embedded in a copper substrate, which has a higher thermal conductivity than steel, so the upper surface cools down more quickly than the steel on the surrounding shroud portions. This would be detected as a cool area on a thermal image of the shroud 32. Details of how to make suitable copper based brazing alloys, such as tungsten carbide embedded in a copper substrate, are provided in U.S. Pat. No. 9,561,562 incorporated herein by reference in its entirety.

In alternative embodiments, or for some thermal inserts 52 in this embodiment, the passive thermal insert 52 comprises an ultra-high molecular weight (UHMW) thermoplastic polymer material (such as polyethylene), which has a lower thermal conductivity than steel, so the upper surface cools down more slowly than the steel on the surrounding shroud portions. This would be detected as a warm area on a thermal image of the shroud 32 (or other wear member). In other embodiments, the shroud 32 (or other wear member) may comprise a material other than steel (for example, white cast iron), or may have a surface layer that has different thermal properties to steel. A thermal insert 52 may include a material that can easily be detected by a UV camera and also easily distinguished from surrounding material or air by the UV camera.

In other embodiments, the threaded stud 76 or other portion extending from the upper target area 74 may comprise the same material as the upper target area 74 or a different material. In embodiments where the portion extending from the upper target area 74 has a different thermal conductivity to the shroud 32, the portion may be tapered so that if the upper target area 74 is completely eroded, and the portion is also eroded then the area detected becomes smaller as erosion continues.

The first insert aperture 72a is located generally centrally on the shroud 32 behind the shroud aperture 66 and towards the upper rear edge 68. The second insert aperture 72b is located to one side of the shroud 32 and towards the upper rear edge 68. The third insert aperture 72c is located to the same side of the shroud 32 and further forward than the upper leg aperture 66. The fourth insert aperture 72d is located near a shroud front edge 78, where the upper and lower legs 60,62 meet. Each insert aperture 72 has a corresponding thermal insert 52 mounted therein (e.g. insert aperture 72b receives thermal insert 52b).

During use, it is anticipated that the fourth thermal insert 52d will wear away first because it is closest to the front edge 78, then the third thermal insert 52c should wear away, then the second 52b or the first thermal insert 52a. The use of these thermal inserts 52 as sacrificial sensors allows detection of the amount of wear experienced by the shroud 32 because, for example, absence of a thermal insert 52 expected to wear away first, where the remaining thermal inserts 52 are still detected, may indicate a first level of wear.

As described above, the thermal insert 52 is preferably visible on the surface of the shroud 32, but in other embodiments it may only be visible after a level of wear has occurred, for example, the thermal insert 52 may be enclosed by the shroud upper leg 60, or it may be mounted in an insert aperture 72, which is then plugged with another material (e.g. a metal or a non-metal, such as an epoxy). This would be suitable for applications where wear detection, particularly surface wear detection, is important.

In some embodiments, the insert 52 may be cast as part of the shroud 32 during manufacture thereof, for example by being installed in what will become an insert aperture 72 during the casting process.

In some embodiments, a thermal insert 52 may be secured to the lip 16, adapter 40 or intermediate adapter 42 on an internal surface thereof such that it is visible only if a part coupled thereto has separated therefrom; thereby indicating loss of the associated intermediate adapter 42, tip 46, or shroud 32.

Figure 7:
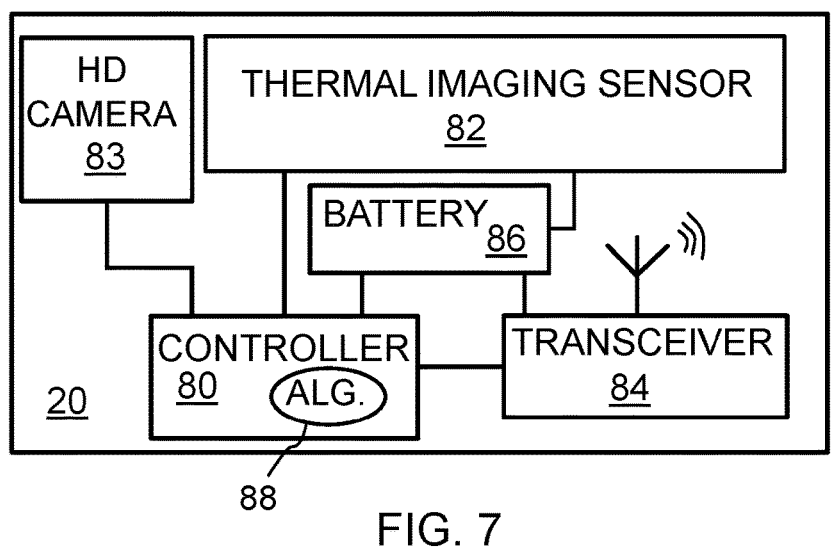
FIG. 7 is a simplified schematic diagram illustrating the electronic components in the monitoring device of FIG. 1.

Reference is now made to FIG. 7, which is a simplified schematic diagram illustrating the electronic components in the monitoring device 20. Monitoring device 20 comprises: a controller 80 (including a processor and associated memory), at least one (but optionally more than one) thermal imaging sensor 82, a high definition (visible spectrum) camera 83, a transceiver 84 for communicating with the remote database 24 (see FIG. 1), a local power source 86, and a thermal map algorithm 88 stored in, and executed by, the controller 80. The thermal map algorithm 88 performs a number of functions, including edge detection, as described in more detail below. In this embodiment, the transceiver 84 is wireless (although it could be wired in other embodiments), and the local power source 86 is a battery, but in other embodiments different power sources may be used (for example, a photo-voltaic panel). The local power source 86 provides power for the components within the monitoring device 20. In this embodiment, the thermal imaging sensor 82 comprises an FLIR AX8 Thermal Imager available from FLIR Systems, Inc. Other sensors are also suitable, such as the FLIR A310 thermal imager.

Although only one thermal imaging sensor 82 is described as being part of the monitoring device 20, in other embodiments, a monitoring device may comprise multiple thermal imaging sensors 82, either located within the same housing, or mounted on different parts of, for example, the bucket 12. This configuration may be used to improve the imaging resolution, or to view thermal inserts that would not be visible from one location (for example, thermal inserts may be located on an upper surface of a wear member, one or more side surfaces of the wear member, and an under surface of a wear member).

In other embodiments, the controller 80 may be located in a different position to (for example, remotely from) the thermal imaging sensor(s). In some embodiments, the remote database 24 may be located near or in the monitoring device 20, and the wireless transceiver 84 may be replaced or supplemented with a wired transceiver.

Other embodiments may not include a high definition camera 83.

In other embodiments, the monitoring device 20 may comprise an ultra-violet (UV) radiation camera, either as a dedicated device, or combined with the HD camera 83 to have a detection range from the ultra-violet region of the electromagnetic spectrum to near infra-red. The monitoring device 20 may also include an excitation source (for example, a UV light source) to stimulate fluorescence or another form of photoluminescence), for example, from a fluorescent (or photoluminescent) material incorporated into the thermal insert 52. The fluorescence (or other form of photoluminescence) may be detected by the UV camera (or combined UV HD camera) and used to detect wear or absence of part of the ground engaging product 14 in which the thermal insert 52 is located.

Figure 8:
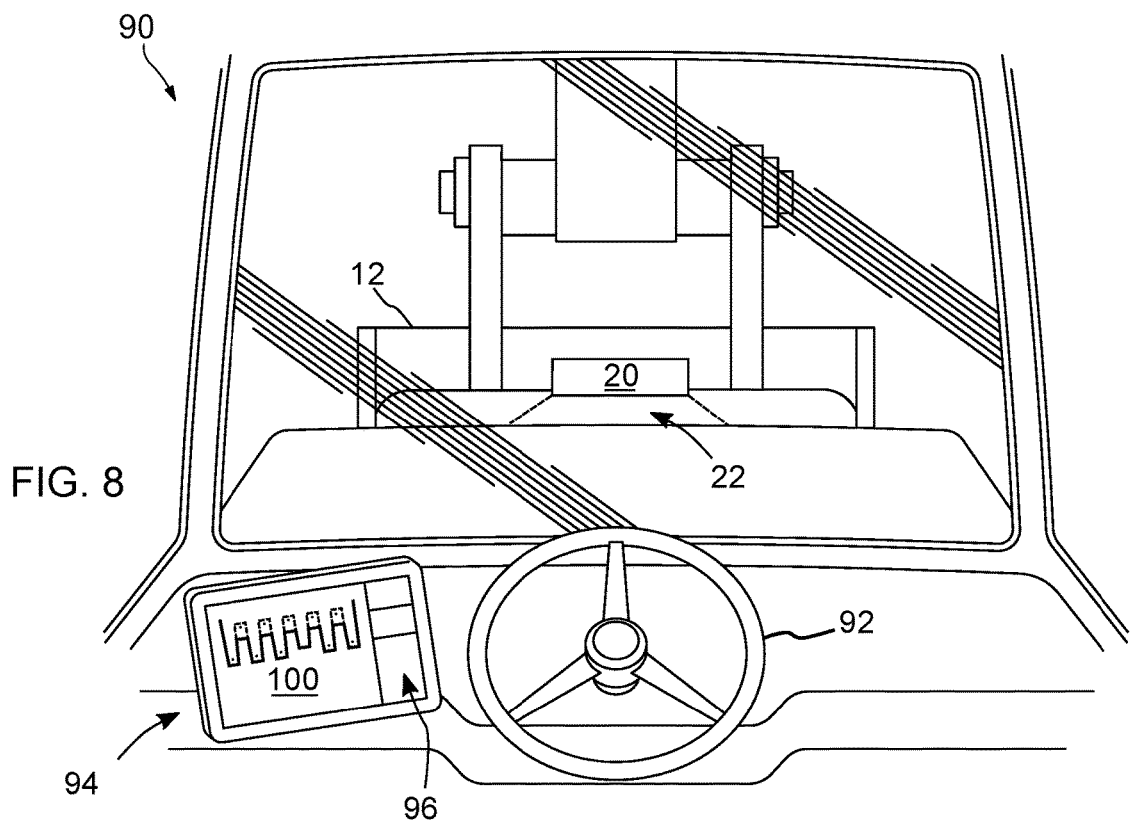
FIG. 8 is a pictorial internal view of the earth working machine looking towards the bucket and illustrating a display device in the machine in communication with the monitoring device of FIG. 1.

Reference is now made to FIG. 8, which is a pictorial internal view of a cab 90 in the earth working machine 10, looking out from the cab 90 and towards the bucket 12. In addition to conventional machine control devices, such as a steering wheel 92, the cab 90 includes a display device 94 removably mounted on a dashboard (or to another fixture) therein. In other embodiments, the display device 94 may be incorporated into a machine controller that controls the operation of the machine 10. In this embodiment, the display device 94 is a tablet computing device that includes one or more transceivers (not shown) supporting Wi-Fi and cellular network connections, and that executes an app (not shown) that communicates with the monitoring device controller 80.

The tablet 94 is in wireless communication with the monitoring device 20 (in particular, via the wireless transceiver 84 in the monitoring device 20). The tablet 94 has a touch sensitive display and presents screens that have a menu portion 96 that includes 'soft' (i.e. programmable touch button) controls and alerts (presented on the screen) and a pictorial, real time, thermal map 100 received from the monitoring device 20 or the cloud computing environment 26.

The teeth 30 and shrouds 32 may be partially or completely obscured from the operator's view from the cab 90, but the machine operator is provided with a view of these wear parts, as will now be described with reference to FIG. 9, which shows an example of the thermal map 100 in more detail.

In this embodiment, the thermal imaging sensor 82 is able to capture the entire edge of the bucket 12 (including all of the ground engaging products 14) in a single image. To improve the resolution of the thermal image, multiple images may be captured and combined (either from one thermal imaging sensor 82, or in embodiments that use multiple thermal imaging sensors, the multiple images may be provided by multiple thermal imaging sensors) to provide sharper contrast between a low temperature area and a higher temperature area. In other embodiments, the thermal map 100 may be created by the controller 80 combining thermal image data from multiple line scans (taken one or several rows at a time) made by the thermal imaging sensor 82. In other embodiments, the cloud computing environment 26 (FIG. 1) may be used to create the thermal map 100.

Ground engaging products 14 heat up as they wear, and the hottest parts of the ground engaging products 14 are at the surface of highest wear. The lip 16 serves as the lowest temperature (or heat sink) as it has the largest thermal mass. In a case where a thermally elevated ground engaging product component is lost, the cooler base component is exposed. For example, if a shroud 32 is lost (removed from the lip 16), then the lip 16 is exposed and presents a lower temperature to the monitoring device 20. The application of this to detecting wear and loss of ground engaging products 14 will now be described.

Figure 9:
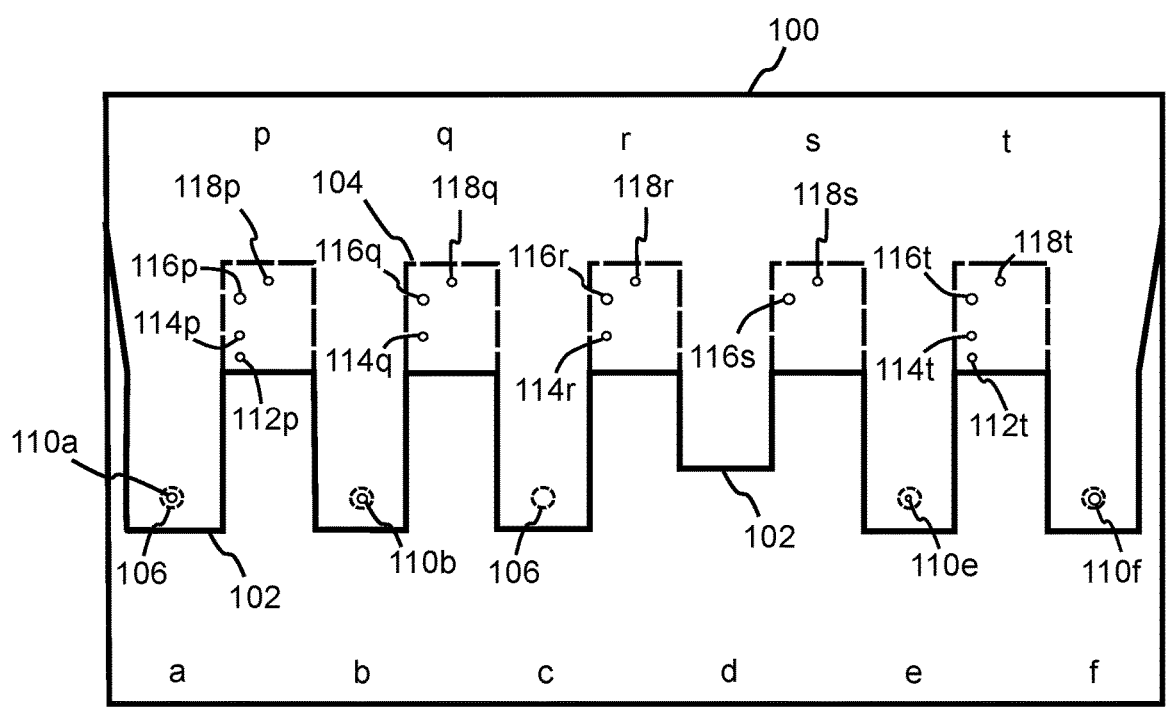
FIG. 9 is a simplified pictorial view of part of the display device (a screen showing a thermal map created by the monitoring device of FIG. 1) of FIG. 8.

As shown in FIG. 9, the controller 80 uses the thermal map algorithm 88 and the high definition (HD) camera 83 to create a simplified outline of the ground engaging products 14 which is provided as a line (the tooth and shroud outline) 102 superimposed on the thermal response data providing by the thermal imaging sensor 82. The HD camera 83 discerns rear edges of the ground engaging products 14, where they interface with the lip 16. In embodiments where the HD camera 83 includes, or is supplemented by, a UV camera, the UV camera may also assist in creating the simplified outline of the ground engaging products 14, and also detecting thermal inserts in the ground engaging products 14. In embodiments where no HD camera is present, the thermal map algorithm 88 may create the simplified outline 102 on its own.

Broken lines (shroud lines) 104 are also provided by the thermal map algorithm 88 to indicate the boundary of each shroud 32. These lines 102, 104 assist a human user in identifying areas on the thermal map 100 corresponding to the thermal inserts 52, and if any thermal inserts 52 are worn or absent. The lines 102, 104 are created by the thermal map algorithm 88 based on the data captured by the thermal imaging sensor 82. The edges of the teeth 30 and shrouds 32 are at a higher temperature than the ambient air in front of the teeth 30 and shrouds 32. This thermal difference is used by the controller 80 to create the boundary lines 102, 104.

A tooth insert marker 106 is also provided by the controller 80 on the map 100 for each tooth 30 indicated by the tooth and shroud line 102. The locations of the tooth insert markers 106 are ascertained based on information captured by the thermal imaging sensor 82 immediately after the ground engaging products 14 were installed on the lip 16. These ascertained locations are stored by the controller 80 in its memory. Alternatively, the locations may be programmed into the controller 80 via the transceiver 84 and a suitable wireless device (not shown), or the remote database 24, executing a thermal insert programming app. In other embodiments, no tooth insert markers, or other markers, may be provided.

The thermal map 100 indicates the temperature profile of each tooth 30 and shroud 32, and any parts of the lip 16 that are imaged. The resolution of the temperature profile depends, at least in part, on the sensitivity of the thermal imaging sensor 82. In practical embodiments, each pixel on the thermal map 100 would indicate a temperature using a different color (or color gradation) for each different temperature (or for temperature block, where a block covers a range of temperatures, for example two degrees centigrade, five degrees centigrade, or the like). For clarity of explanation the thermal map 100 shown in FIG. 9 indicates areas of lower temperature as small bounded areas (generally circular), but this is merely provided to assist understanding given the limitations on drawings in patent documents. It is preferred that the thermal imaging sensor 82 has multiple pixels for imaging each thermal insert 52 so that any change in size of the thermal insert 52 can be detected and represented on the thermal map 100.

As shown in FIG. 9, the six teeth 30 are labelled 'a' through 'f' (from left to right) at the bottom of the map 100, and the five shrouds 32 are labelled 'p' through 't' (from left to right) at the top of the map 100. This labelling is primarily to aid identification of the particular tooth and shroud being discussed.

The pixels on the map 100 representing the first tooth (tooth 'a') have low temperature (tip thermal insert) pixels 110a covering a significantly smaller area of the map 100 than the tooth insert marker 106. This indicates that the corresponding thermal insert 52 on the tip 46 of the first tooth 30 has been worn away significantly. A similar amount of wear is shown by low temperature pixels 110b (on the second tooth). Even more wear is indicated by low temperature pixels 110e (on the fifth tooth). Slightly less wear is indicated by low temperature pixels 110f (on the sixth tooth). No low temperature pixels at all are visible on the third tooth; indicating that the corresponding thermal sensor has been worn away completely, or at least to a size below that which can be detected. Similarly, no low temperature pixels at all are visible on the fourth tooth; but on that tooth the end portion (corresponding to the tip 46) is missing.

The absence of the fourth tooth tip 46 indicates to a user that the tip should be replaced. Even if the fourth tooth tip 46 was present, the absence of low temperature pixels on the third tooth would indicate that the teeth should be replaced, but this may depend on the particular tooth replacement policy of the owner of the earth working machine 10.

The significant wear on the fifth tooth may also indicate that the teeth should be replaced.

The comparison of the area covered by the low temperature pixels to the area covered by the tooth insert marker 106 may be performed by the controller 80 (for example, using the thermal map algorithm 88), the cloud computing environment 26, another remote processor, or the like. The comparison may also (or solely) be made by a human operator. When the comparison is performed automatically (for example, by the controller 80 or the cloud computing environment 26), the processor may generate an alert (audible, visual, or tactile) when part of a ground engaging product 14 is significantly worn or missing.

In this embodiment, in contrast to the teeth 30, each of the shrouds 32 has four areas. These correspond to the four thermal inserts 52a to 52d in FIG. 6; however, in this embodiment, each thermal insert 52 in the shroud 32 is smaller than the thermal insert 52 in the tooth 30 because what is being detected is primarily presence or absence of a low temperature area where the corresponding thermal insert 52a,b,c,d should be. The closest pixel area to the front of the lip 16 (shroud front pixels) is labelled 112, the next closest (shroud second to front pixels) 114, then 116 for the area furthest back and to one side (shroud rear side pixels), and 118 for the central pixel area towards the rear of the shroud 32 (shroud rear central pixels).

The pixels on the map 100 representing the first and fifth shrouds (shrouds 'p' and 't') have low temperature pixels (112p,t; 114p,t; 116p,t; and 118p,t) covering all four thermal insert areas. This indicates a relatively low level of wear on those two shrouds 32.

The pixels on the map 100 representing the second and third shrouds (shrouds 'q' and cry) have low temperature pixels (114q,r; 116q,r; and 118q,r) covering three of the four thermal insert areas. This indicates some wear on those two shrouds 32, although probably not critical wear.

The pixels on the map 100 representing the fourth shroud (shroud 's') have low temperature pixels (116s and 118s) covering only the rearmost two of the four thermal insert areas. This indicates significant wear on that shroud 32, and it may need to be replaced.

In other embodiments, any convenient number or type of thermal inserts may be used on the teeth 30 and shrouds 32.

In addition to using the thermal imaging sensor 82 to detect wear, and absence of portions, of the ground engaging products 14, it may also be used at installation of all of some ground engaging products 14 to enumerate what is present. For example, after the teeth 30 and shrouds 32 have been installed, the ground engaging products 14 may be warmed, either using an external heat source (for example, a hot air blower), an internal heat source (described in more detail below), or by using the ground engaging products 14 for a short period to apply heat by friction due to contact with the earthen material (such as rocks) being broken down.

The thermal imaging sensor 82 can detect heat differences between the ground engaging products 14 and the ambient air, and between the ground engaging product material and the thermal inserts 52. Using this information, the controller 80 can create a thermal map to indicate what ground engaging products 14 are present and to show the component representation or edges 102, 104 and markers 106. The controller 80 can transmit this information to a remote app (for example, executing on a wireless device carried by a human operator or in the cloud computing environment 26) that compares the detected ground engaging products 14 with those that were due to have been installed on the earth working machine 10 (or the controller 80 may perform this comparison itself). The remote app (or controller 80) can then create a notification that there is a match or a m is-match between what was detected and what was due to have been installed. In the event of a mis-match between what was due to be installed and what was detected, the notification may comprise one or more of an audible, visual, and tactile alert. This enumeration information can also be relayed to a remote center that records and tracks deployment and usage of such ground engaging products 14.

The mis-match may relate to the installed ground engaging products 14 being of a different size or different configuration to the ground engaging products 14 that were intended to be installed, or to ground engaging products 14 being improperly installed, or some ground engaging products being missing (such as an adapter not having a corresponding tip), or to an incorrect type of ground engaging product 14 being installed (for example, a standard duty ground engaging product 14 instead of a heavy duty ground engaging product of the same size). A tip of a standard duty and a tip of a heavy duty ground engaging product may both fit on the same adapter (or intermediate adapter) but may be geometrically different, or have different coatings, materials, or hardened areas.

In some embodiments, a thermal insert may be installed on part of a ground engaging product 14 to indicate what part is installed. The thermal insert may have a different location, size, shape or the like to indicate what part is on the earth working machine 10. An owner of the machine 10, or a vendor of the ground engaging products 14, may have a classification system that maps a thermal insert's location, size, shape or the like to a part identification.

The thermal inserts may also be used to differentiate parts from one vendor from parts from other vendors. This would enable performance (e.g. wear or loss) of one vendor's parts (e.g. a shroud, a lock, an intermediate adapter or a tip) from one vendor to be compared with parts from another vendor during operation of the machine 10.

A ground engaging product vendor may use a unique marker formed by a thermal insert to designate itself as the manufacturer of that ground engaging product.

In some other embodiments, no thermal inserts may be provided on the ground engaging products 14. Instead, the controller 80 may create an alert (audible, tactile, or visual) when an alert criterion is met. The alert criterion may comprise a thermal image of part of the ground engaging products 14 being smaller than previously measured, indicating significant wear or a missing part of the ground engaging product 14. In some simple embodiments, no detailed visual representation (such as those shown in FIGS. 8 and 9) may be provided to an operator; instead, a simple visual indication may be provided to show that part of a ground engaging product 14 is worn or missing.

Figure 10:
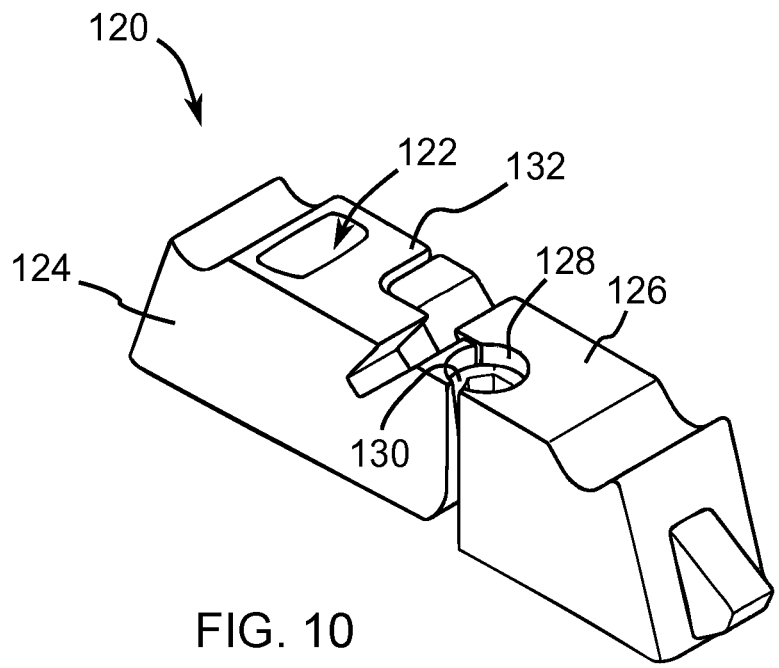
FIG. 10 is a front perspective view of a folding lock for the shroud of FIG. 6, having an opening for a thermal insert.
Figure 11:
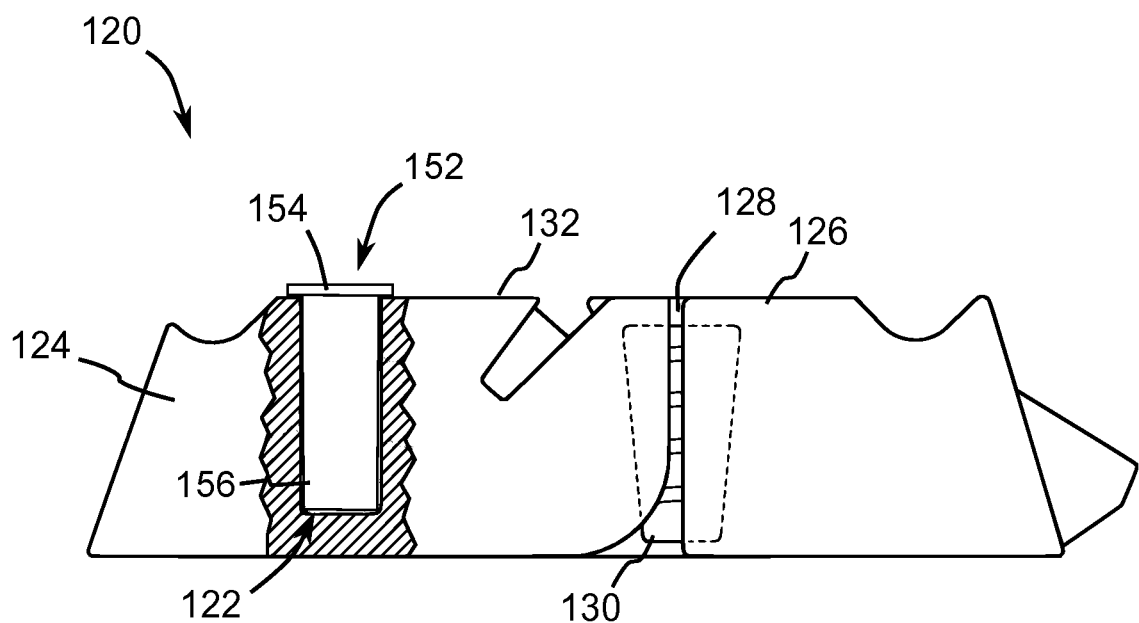
FIG. 11 is a partial cross section view of the folding lock of FIG. 10, illustrating a thermal insert mounted in the opening thereof.

Reference is now made to FIG. 10, which is a front perspective view of a folding (or pivoting) lock 120 for securing the shroud 32 to the lip 16, and having an opening 122 for a thermal insert 152; and also to FIG. 11, which is a partial cross sectional view of the folding lock 120 illustrating the thermal insert 152 mounted in the opening 122.

The folding lock 120 is similar to the folding locks disclosed in U.S. Pat. No. 8,074,383, incorporated herein by reference in its entirety. Folding lock 120 comprises two interlocking components 124, 126 that define a circular threaded passage 128 therebetween. A retainer 130 in the form of a threaded rod is threaded into passage 128 when the folding lock 120 is in the retaining position, thereby preventing relative movement (e.g. pivoting) between the two components 124, 126. As a result, the lock 120 presents a strong, integral pin to resist heavy loading and prevent release of the shroud 32 from the lip 16.

In this embodiment the first component 124 defines the opening 122 in an upper surface 132 thereof, although in other embodiments the second component 126 may define an alternative or an additional opening.

In this embodiment the thermal insert 152 comprises a passive insert that has a cap portion 154 overlying an edge defining the opening 122, and a stem portion 156 extending from an underside of the cap portion 154. The stem portion 156 has a generally cuboid shape in this embodiment, but other shapes may be used if preferred, or an active thermal insert may be used. In some embodiments the stem portion 156 may have a tapered shape so that its cross-sectional area near the cap portion 154 is larger than its cross-sectional area near the bottom of the opening 122.

The stem portion 156 may comprise a different material than the cap portion 154, having different thermal properties (for example, a better thermal insulator or a better thermal conductor).

The thermal insert 152 in the folding lock 120 may be used in addition, or as an alternative, to the thermal inserts 52 that are mounted in the shroud 32.

Imaging of the thermal insert 152 is conducted in the same manner as described with reference to FIGS. 8 and 9.

In the above embodiments, the thermal inserts 52, 152 are passive. In other embodiments, however, active thermal inserts may be used. An active thermal insert typically includes a power source and has some mechanism for heating or cooling the insert. Active thermal inserts may also include additional components.

Figure 12:
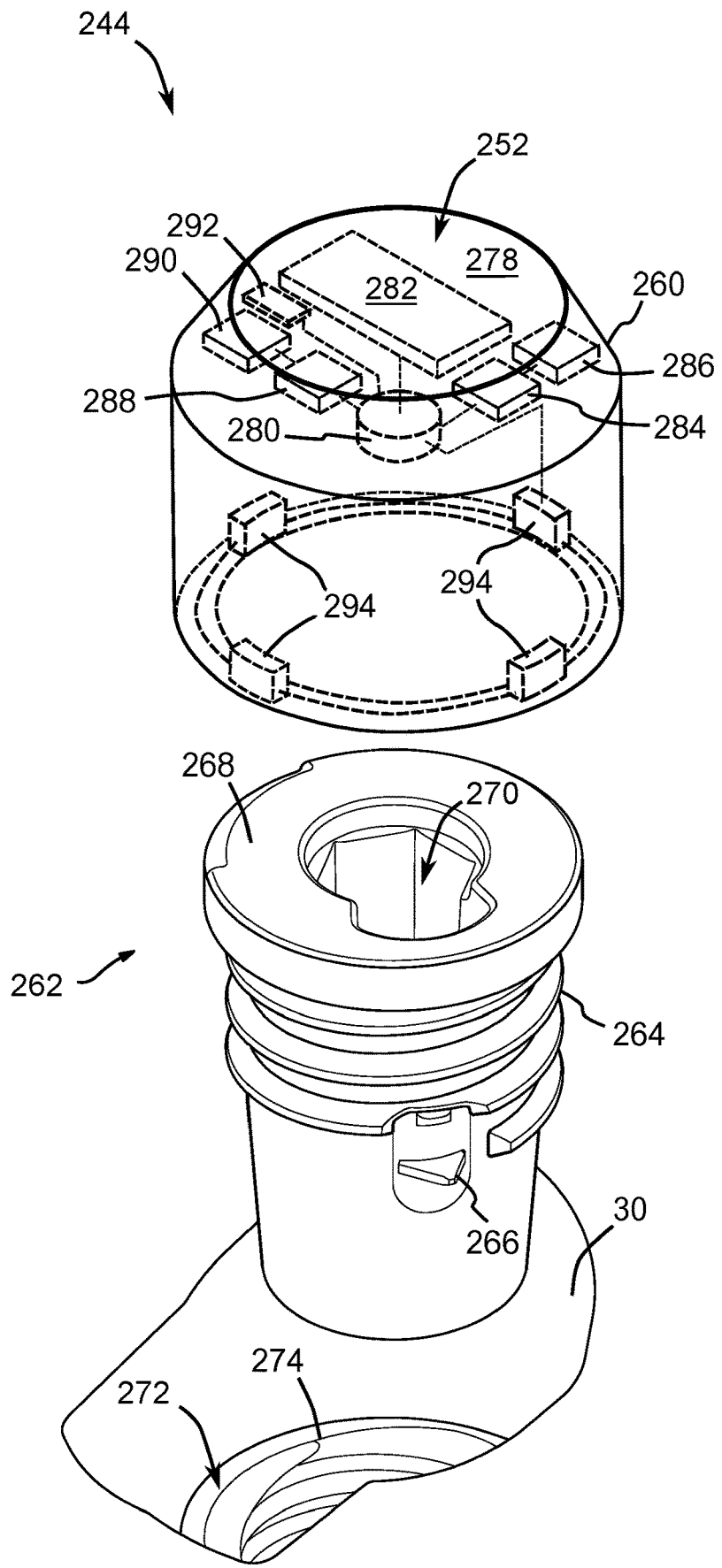
FIG. 12 is an exploded perspective view of an alternative thermal insert mounted on a lock and suitable for use with the tooth of FIGS. 4 and 5.

Reference is now made to FIG. 12, which is an exploded perspective view of a lock 244 that includes an active thermal insert 252 incorporated into a cap 260 surrounding part of a lock and suitable for use with the tooth 30. The lock 244 and cap 260 are similar to the lock and cap described in US 2019 0153703 A1, incorporated herein by reference in its entirety; the primary difference being the additional components included within the cap 260 that comprise the active thermal insert 252.

The lock 244 includes a pin 262 defining protruding threads 264, a latch 266, an upper (or outer) end 268, and a tool receiving formation 270 for receiving a hex key or the like to drive the pin 262 into a complementary collar 272 (only partially visible in FIG. 12) that is mounted in the tooth 30 and includes a threaded bore 274 having complementary threads to the pin protruding threads 264.

The pin cap 260 includes the active thermal insert 252, which comprises an upper thermal surface 278 (having thermal properties differing from those of the remaining portions of the cap 260) and various electrical components. These components include a power source 280 (in this embodiment it is rechargeable, but that is not essential) and a thermal unit 282. In this embodiment, the thermal unit 282 comprises a resistive heating element, but in other embodiments a Peltier type cooler or other thermoelectric assembly may be used, depending on whether heating or cooling of the thermal insert 252 is desired.

When not operating (for example, when the earth working machine 10 is undergoing maintenance, or prior to being used at the start of the day or at the start of a working shift), the ground engaging products 14, lip 16 and bucket 12 will not have accumulated heat from friction events, so the thermal unit 282 is provided to create a measurable thermal difference between the active thermal insert 252 and the surrounding material in the lock 244, the ground engaging products 14 or the lip 16.

In addition (or as an alternative) to the thermal unit 282, the active thermal insert 252 also includes a thermal emitter 284 (in this embodiment an infrared emitting laser or diode, but alternative thermal sources could be used) to provide a known emission intensity that can be detected by the monitoring device 20, and used to calibrate the emissions, if required or desired, by comparing it with (i) the known emission value for that thermal emitter 284 and (ii) the distance between the monitoring device 20 and the active thermal insert 252.

The active thermal insert 252 also includes an accelerometer 286 incorporated in the insert 252. The accelerometer 286 (alternatively, a gyroscope sensor may be used instead of the accelerometer 286) is a MEMS (MicroElectroMechanical Systems) component in this embodiment. The accelerometer 286 can detect when the tooth 30 is moving and the angle the tooth 30 is oriented at.

The active thermal insert 252 also includes a controller 288 (such as a simple processor or programmed logic unit) programmed to activate and coordinate different available functions of the insert 252. For example, the controller 288 can determine from an accelerometer 286 that the bucket 12 has not moved for a certain period of time and on initial movement (or in response to a command received from a remote interface, or at preset times) the controller 288 can turn on the thermal unit 282 or the emitter 284 to allow the monitoring device 20 to detect the active thermal insert 252.

The active thermal insert 252 also includes a transceiver 290 (in this embodiment a Bluetooth (trade mark) low energy transceiver) to communicate with the monitoring device 20 or other systems in the vicinity of the earth working equipment 10.

The active thermal insert 252 also includes a temperature sensor 292 located near to the upper thermal surface 278 and operable to measure the temperature thereof and other parts of the cap 260 or the lock pin 262.

To recharge the power source 280, the active thermal insert 252 can include a charging unit 294 that provides a flow of current to the power source 280. In this embodiment, the charging unit 294 comprises a ring of coupled piezoelectric components that generate electricity when compressed. The piezoelectric components 294 can be positioned adjacent two components of the tooth 30 so that relative movement of those components during operation compresses the piezoelectric components 294, thereby generating electricity to recharge the power source 280.

In this embodiment, the piezoelectric components 294 are positioned adjacent the lock pin 262 and the collar 272 mounted in the tooth 30. As the lock pin 262 shifts it compresses the piezoelectric components 294 between the lock pin 262 and the collar 272. The piezoelectric components 294 are configured as a ring with multiple, circumferentially spaced piezoelectric elements so that displacement of the lock pin 262 in any direction will compress at least one piezoelectric component 294.

In other embodiments, the piezoelectric components 294 may be mounted at a different location and in a different configuration, or only a single piezoelectric component may be used. In one embodiment, the lock pin 262 may be hollow and the piezoelectric component or components 294 may be located at a distal end of the lock pin 262 to the upper end 268. Movement of the tip 46 relative to the intermediate adapter 42 causes the lock pin 262 to shift position.

In other embodiments, only a subset of the components 282 to 294 may be included in an active thermal insert 252. For example, the active insert 252 may only include a thermal surface, the power source 280, the thermal unit 282, and a simple controller; the other components 284, 286, 290, 292, 294 being optional. The power source, thermal unit, or controller may even be remote from the active insert and operate wirelessly (for example, heating or cooling the thermal surface without being in contact therewith).

In other embodiments, additional components may be included in an active thermal insert 252, for example, one or more sensors from a group consisting of radio frequency enabled modules, orientation sensors, temperature sensors, accelerometers, proximity sensors, force sensors, pressure sensors, and position sensors. Other sensors such as disclosed in U.S. Pat. No. 10,011,975, which is incorporated by reference, could be included in the active thermal insert 252 to provide additional sensing. In some embodiments, the functions of one or more of the above described components may be combined into a single component.

In other embodiments, instead of a cap 260 housing the various components 280 to 294, these components may be located beneath, or to one side of, the upper thermal surface 278.

Information collected by the various components 282 to 292 may be sent by the controller 288 to the monitoring device or another remote monitoring system, such as an Equipment Control Unit (ECU), described in more detail below.

Figure 13:
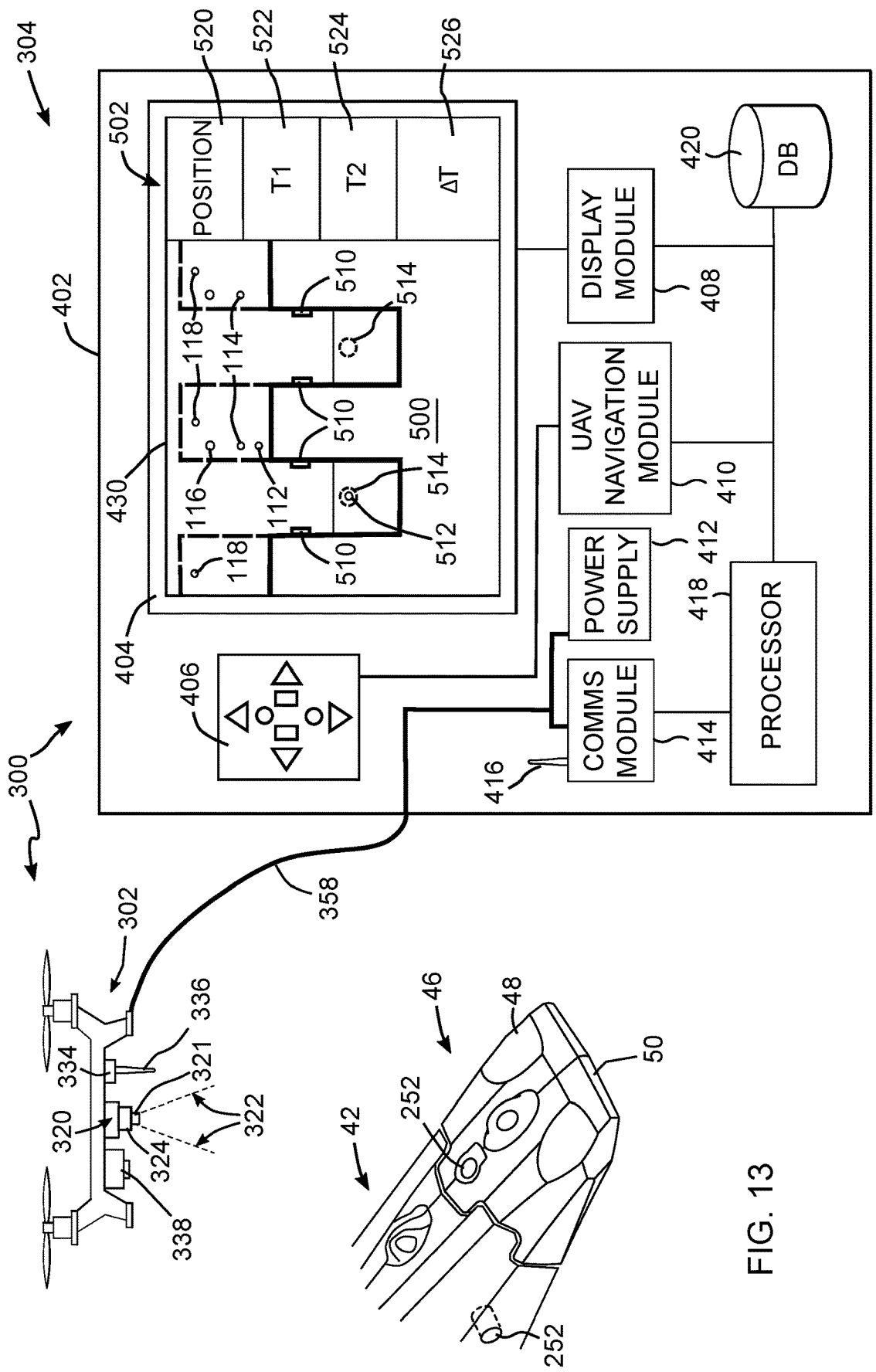
FIG. 13 is a schematic representation of a monitoring system according to another embodiment of the present invention, where the monitoring system includes an Unmanned Aerial Vehicle (UAV) controlled by an Equipment Control Unit (ECU) for monitoring device ground engaging products.

Reference is now made to FIG. 13, which is a schematic representation of a monitoring system 300 according to another embodiment of the present invention. The monitoring system 300 includes an Unmanned Aerial Vehicle (UAV) 302 controlled by an Equipment Control Unit (ECU) 304, and is operable to monitor ground engaging products, such as those described above with reference to FIGS. 1 to 6.

The UAV 302 is a conventional drone that has been modified to include a monitoring device 320 and other components described below. The monitoring device 320 is similar to monitoring device 20 and has a thermal imaging sensor 321 (similar to that described with reference to FIG. 7). The thermal imaging sensor 321 has a field of view 322 (shown in broken lines in FIG. 13). The thermal imaging sensor 321 is mounted on an adjustable stage 324 in the form of an actuated motorized 3-axis gimbal to allow a broad range of movement of the sensor 321 relative to the UAV 302.

The UAV 302 also includes a communication module 334 having an antenna 336 to provide wireless communication with active thermal inserts 252 and the ECU 304.

In some embodiments, the UAV 302 also includes an attenuation characterization module 338. Airborne particles such as dust, fog and rain can attenuate a signal by reflection, absorption, scattering, or diffraction. Measurement of a signal from a surface, such as emitted infrared radiation, can be affected by the intervening particles and provide an inaccurate or altered measurement. Measuring the density or effect of particles between the measured surface and the characterization module 338 can provide an estimation of the error or provide a correction factor (or calibration) to improve the accuracy of the measurement.

An attenuation characterization module 338 could take many forms. In one example, the attenuation characterization module 338 may include a laser that can point at, and impinge on, a surface of the thermal insert 52, 152, 252. The intensity of the measured reflection can provide data on the particle density between the attenuation characterization module 338 and the thermal insert surface (e.g. upper target area 74, thermal insert cap portion 154, or upper thermal surface 278). Alternatively, or additionally, the attenuation characterization module 338 may measure a signal from the thermal emitter 284, calculate a distance from the thermal emitter 284 to the attenuation characterization module 338, and compare the measured signal with stored measured intensities to ascertain the attenuation. This ascertained attenuation can then be used to scale subsequent measurements at that position of the UAV 302.

In this embodiment the UAV 302 is physically coupled to the ECU 304 by a tether 358 that includes a power cable to deliver power to the UAV 302 and may also provide data transmission capabilities, but in other embodiments the UAV may not be tethered (it may rely on batteries and wireless control and communication instead). Alternatively, or additionally, data can be transmitted wirelessly between the UAV 302 and the ECU 304, as described below.

The ECU 304 comprises a housing 402 supporting a display 404 for presenting information to a human user of the ECU 304, and UAV physical controls 406 (such as a joystick, directional buttons, or other conventional controls for a UAV). The UAV physical controls 406 also allow a user to move the adjustable stage 324, if desired, to enable the thermal imaging sensor 321 to have a clearer view of one or more active thermal inserts 252.

The housing 402 also encloses internal components that are typically not visible to a user. These internal components include a display driver module 408 for controlling the display 404, a UAV navigation module 410 that receives UAV control information from the UAV physical controls and relays them to the UAV 302 thereby allowing the user to manipulate the UAV 302 to align the field of view 322 over a desired set of ground engaging products 14 (FIG. 2) to be monitored, so that the monitoring device 320 has a line of sight view of the wear part to be detected.

The UAV 302 may include additional components, such as a GPS sensor to assist control and movement of the UAV 302. One or more reference points, or datum, may be provided to assist with navigation of the UAV 302. Such datum may include one or more of: a datum established at the earth working machine 10, a datum established on the bucket 12, a datum established on the ground engaging products 14, and a datum established at a calculated point adjacent to the earth working machine 10.

The internal components also include a power supply 412 for powering both the UAV 302 and the ECU 304, a wireless communication module 414 having an antenna 416 for wireless communication with the UAV 302 and any active thermal inserts 252 in the ground engaging products 14 being monitored.

The internal components within the housing 402 also include a processor 418 for controlling the operation of the ECU 304, and a local store (which may be in the form of non-volatile memory) 420.

The display 404 renders screens 430 that are presented to the user of the ECU 304. One part of the screen 430 displays a thermal map 500 to illustrate those parts of the ground engaging products 14 that are being monitored. Another part of the screen 430 displays temperature information 502. This temperature information 502 may include an indication of which thermal insert 252 is being measured, a temperature of that thermal insert 252, a measured temperature of a non-insert part of the ground engaging product 14, for example, a portion of the tip 46 surrounding that thermal insert 252, and the temperature difference between those measured areas. The screen 430 may cycle through each thermal insert 252 in turn. In other embodiments, multiple columns of temperature information 502 may be provided on the screen 430 instead of the thermal map 500. Other visual and audible representations of the information are also possible. In other embodiments, the thermal map 500 may be similar to the thermal map 100.

In a similar way to the passive thermal insert embodiment, a user can view the screens 430, and particularly the thermal map 500 and temperature information 502 to ascertain if any parts of the edge of the bucket 12 (e.g. the ground engaging products 14 or the lip 16) need to be replaced. This evaluation may also be performed automatically by the processor 418 or by a remote computer, such as the cloud computing environment 26.

The monitoring device 320 can perform a calibration for the measured temperature, as described above using the thermal emitter 284 signal. Alternatively, or additionally, the monitoring device 320 can perform a calibration by comparing a temperature measured by the temperature sensor 292 (and transmitted to one or both of the ECU 304 (via the transceiver 290 and the wireless communication module 414) and the UAV 302 (via the transceiver 290 and the communication module 334), and comparing the temperature(s) measured by the monitoring device 320 with the transmitted temperature(s) (from the temperature sensor 292). The latter calibration can also be used to assess any attenuation due to particles in the air, fog, and the like.

Additional information may also be transmitted from the active thermal insert 252 to the UAV 302 or ECU 304, such as information about the motion or position of the bucket 12 (from the accelerometer 286), which may indicate whether the bucket 12 is at rest or in use, or whether the thermal insert 252 has been removed from the bucket 12 (for example, where an active thermal insert 252 is mounted in a tip 46 and that tip 46 has been broken off).

The ECU 304 may store such received information in the local storage 420 to provide a database of historical data. The ECU 304 may also transmit the received information to a remote database, such as cloud database 24 (FIG. 1).

In a similar manner to the first embodiment, the result of the comparison between detected thermal inserts 252 and expected thermal inserts may trigger a notification which may be implemented as a visual alert presented on the display 404, and optionally relayed to other devices.

The example illustrated in FIG. 13 shows a thermal map imaging two teeth and three shrouds. Each of the two teeth includes an intermediate adapter having two active thermal inserts 252 one on each side thereof (illustrated by intermediate adapter thermal pixels 510), and a tip having a single, central active thermal insert 252 (illustrated by tip thermal pixels 512 overlaid by a tip insert marker 514). The UAV 302 may be moved in a circular or elliptical manner to ensure that the monitoring device 320 has a sufficient line of sight view of the active thermal inserts 252 (for example, being able to see each of the side thermal inserts 252).

The temperature information screen portion 502 presents text information on the right including insert identification information 520, a temperature (T1) 522 of that thermal insert 252, a temperature (T2) 524 of an area near that thermal insert 252, and a temperature differential 526 (i.e. T2-T1). The display can show an alert on the display 404 (and optionally the ECU 304 can emit an audible sound via a speaker (not shown)) visible to a user of the ECU 304 when the temperature differential 526 falls below a threshold. These alerts may be wirelessly relayed to an operator of the earth working machine 10, other equipment operators, wireless devices for access by the operator or others such as maintenance personnel, mine site managers or the like. Other alerts may be used.

The visual alert may be, for example, a graphical picture displaying each monitored ground engaging product 14 and the status of each ground engaging product 14 (e.g., absent/present, acceptable wear, damage, needing maintenance, and reduction in productivity).

The processor 418 may be programmed to produce a precautionary alert that a specific ground engaging product 14 (or part thereof) is missing or at or near the end of its service life (for example, equal to or less than the recommended minimum wear profile). The alert may be, for example, a visual alert, haptic feedback, and/or an audio alert.

In addition, the programmable logic may provide the operator an indication of current flaws or predictions of future flaws that may lead to loss, damage, or failure of the ground engaging product 14 that may lead to a reduction in productivity and/or equipment downtime. For example, a crack in part of a ground engaging product 14 may be evidenced by a change in temperature (for example, an edge on the thermal image) that is detected by the monitoring device.

The ECU 304 may be a wireless device, it may be integrated with a display system currently in the excavating equipment (e.g., with the OEM display), integrated with a new display system within the excavating equipment, and/or may be located in a remote location.

The ECU 304 may be designed to display a history chart so that a user can determine when an alert happened so that the user can take the necessary actions if all or part of a ground engaging product 14 is lost.

When the earth working machine 10 is not in use, the UAV 302 may move in close proximity to the earth working machine 10 to better analyze the condition of the ground engaging products 14.

Figure 14:
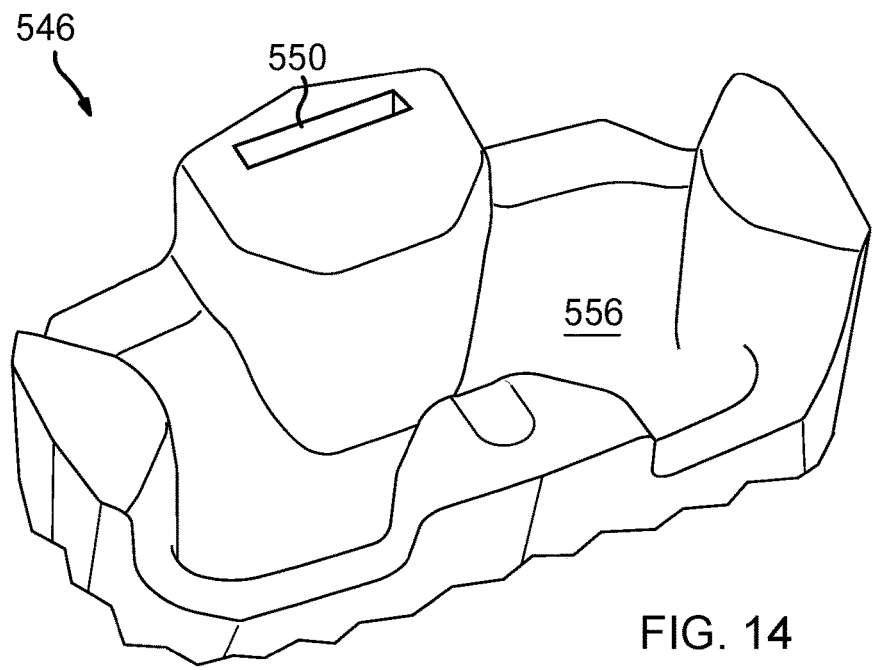
FIG. 14 is a partial perspective view from the rear of part of a tooth (a tip) including a thermal insert.
Figure 15:
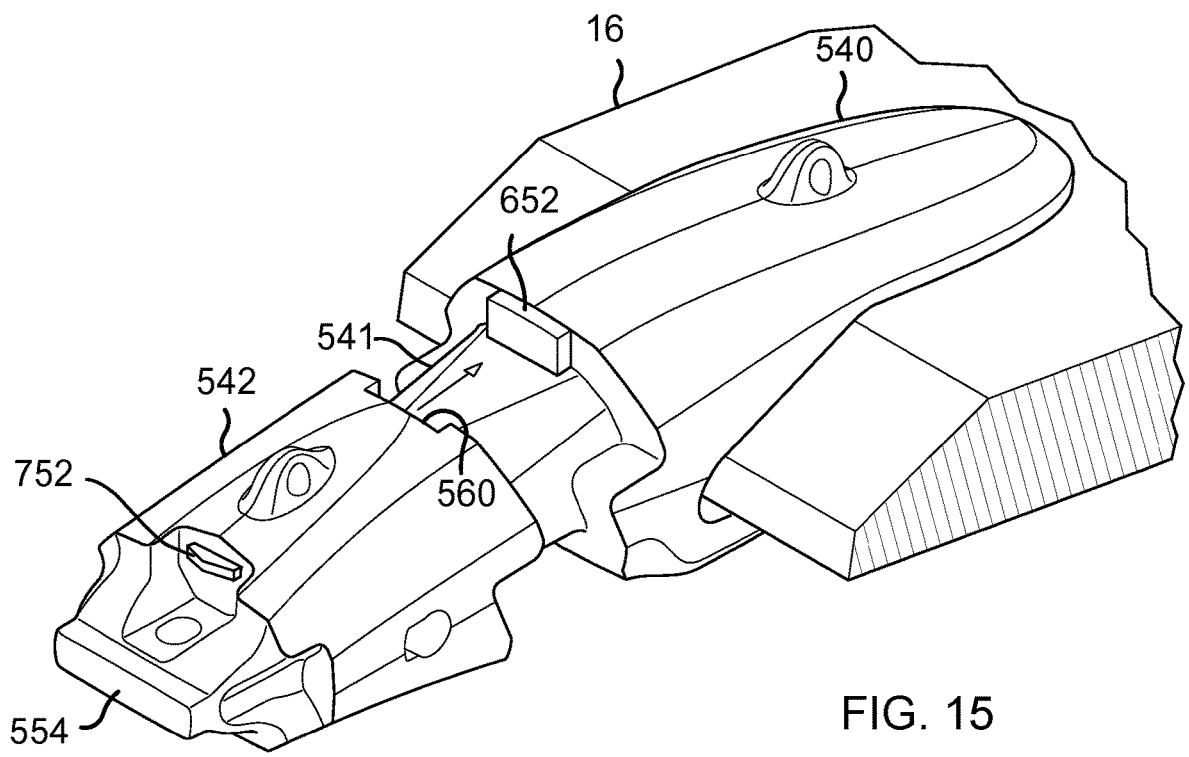
FIG. 15 is a perspective view from the front of the remaining parts (an adapter and an intermediate adapter) of the tooth of FIG. 14 mounted on the lip of the bucket of FIG. 2, according to another embodiment of the present invention.

Reference will now also be made to FIGS. 14 and 15, which illustrate an alternative tooth according to another embodiment of the present invention. This embodiment (which may be combined with any of the previous embodiments) allows for easy detection of when parts of a tooth are unintentionally removed (i.e. separated). FIG. 14 is a partial rear perspective view of a tip 546 including a thermal insert recess 550 centrally located above a cavity 556, and FIG. 15 is a perspective view from the front of the remaining parts (an adapter 540 and an intermediate adapter 542) of the tooth.

The adapter 540 is mounted on the lip 16 of the bucket 12, and includes a protruding nose 541 and a thermal insert 652 mounted above the nose 541.

The intermediate adapter 542 has a rear recess 560 complementing the shape of the thermal insert 652; and a front thermal insert 752 complementing the shape of the tip insert recess 550 to be received into that recess 550 when the tip 546 is slidably coupled to the intermediate adapter 542. The intermediate adapter 542 also has a front face 554 dimensioned to be received within the tip cavity 556 on slidable engagement therewith.

When fully assembled and operational, the adapter thermal insert 652 can be detected by the monitoring device 20, 320; but the front thermal insert 752 is only detected when the tip 546 has been partly or fully removed from the intermediate adapter 542. If the front thermal insert 752 is detected during operation then this indicates unintentional removal of the associated tip 546.

In other embodiments, the inserts and recesses may be located on different parts to those described above, and may have a different size, shape, material, or configuration to those described above. Active or passive thermal inserts (or a mixture thereof) may be used in variations of the above embodiments. For example, lock 244 may only include one or more passive thermal inserts, or both active and passive inserts.

Although some features have only been described with respect to one embodiment, these features may be used in other embodiments. For example, the adjustable stage 324 and the attenuation characterization module 338 may be used with the monitoring device 20 mounted on the bucket 12 or other earth working equipment or site surveillance equipment.

Figure 16:
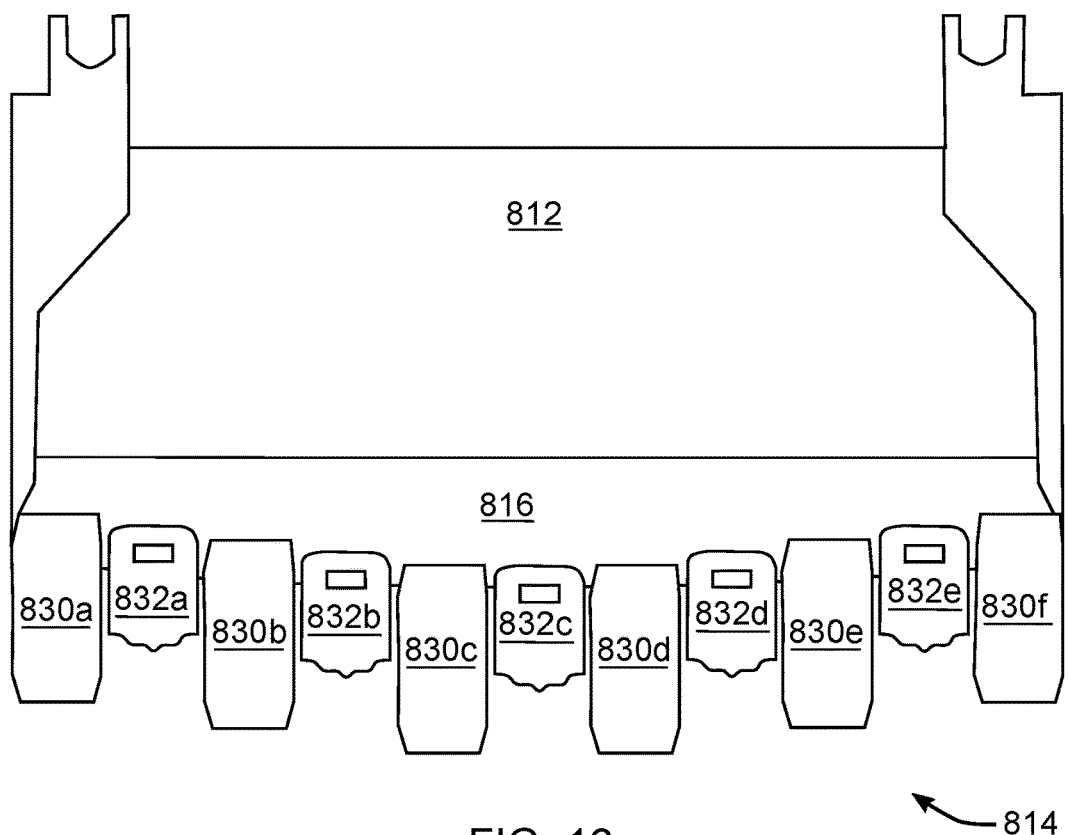
FIG. 16 is a schematic diagram illustrating part of another bucket.

Reference is now made to FIG. 16, which is a schematic diagram illustrating part of another bucket 812, including a lip 816, on which are mounted various ground engaging products 814 including teeth 830 and shrouds 832. There are six teeth (labelled 830*a* through 830*f*) and five shrouds (labelled 832*a* through 832*e*), each shroud 832 being located between adjacent teeth 830. The teeth 830 are numbered sequentially from '1' to '6' from left to right, so that tooth '1' (830*a*) is located on the far left hand side of the bucket 812 and tooth '6' (830*f*) on the far right hand side.

Figure 17:
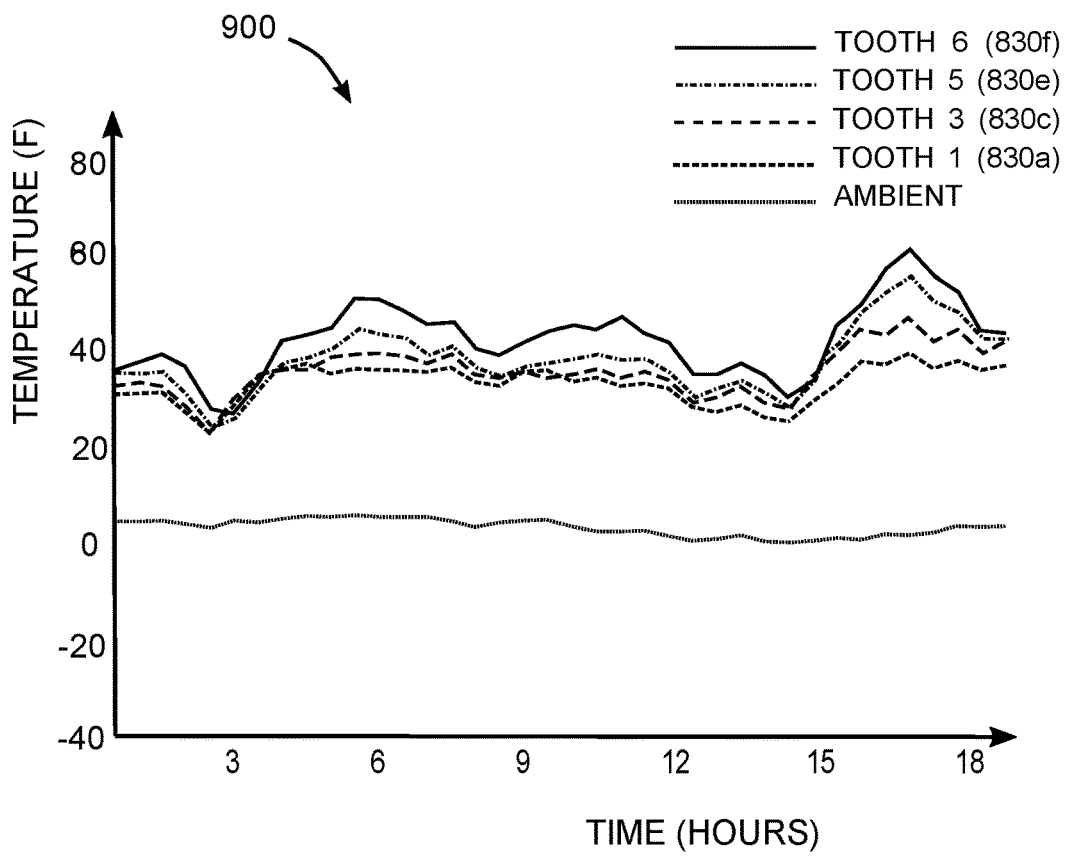
FIG. 17 is a simplified graph illustrating temperature profiles of four teeth from the bucket of FIG. 16.

The monitoring device 20 (or 320) records the temperature of these teeth 830 and shrouds 832 over a period of time, during operation of the bucket 812. This is illustrated in FIG. 17, which is a simplified graph 900 illustrating temperature profiles of four teeth 830 from the bucket 812 (the temperature profiles of the other two teeth 830*b,d* and the shrouds 832 are not shown for clarity). These temperature profiles were recorded by the monitoring device 20 (or 320), which may use the thermal imaging sensor 82 to record the temperatures (either from the surface of the ground engaging products 814, and/or from active 252 or passive 52 inserts in the ground engaging products 814). Alternatively, or additionally, the monitoring device 20 (or (320) may receive the temperatures from the temperature sensor 292 in an active thermal insert 252, or from a standalone temperature sensor (not part of an active thermal insert), via the transceiver 84 (or the wireless communication module 334).

The graph 900 shows the recorded temperature of each of the four teeth 830*a,c,e,f* at thirty minute intervals. It is clear that tooth number '6' (830*f*) has an elevated temperature profile compared with tooth number '1' (830*a*). As shown on the graph 900, the temperature profile rises from tooth '1' to tooth '6'.

It is believed that high wear rate is associated with high loads, and since temperature rises with wear, load on the lip 816 can be shown through measuring the temperatures of the ground engaging products 814. This can be shown both instantaneously (as illustrated by graph 900) and relayed to the display device 94. The temperature profiles may also be stored (e.g. by the remote database 24) and analyzed (e.g. by the cloud computing environment 26) to deduce data trends over an extended time period. When analyzed over several months, the difference in temperature profiles of ground engaging products 814 on the lip 816 may indicate which side of the bucket 812 has received more cumulative loading. The magnitude of the difference in temperature profiles (e.g. the spread of the temperature profiles) may indicate the number or percentage of asymmetrical loads that have occurred. By analyzing this data, owners of the earth working machines 10 can avoid expensive repairs on these machines 10 (including, for example, a boom and stick on a power shovel), where damage is influenced by torsional effects arising from non-centered digging loads on the lip 816. This may be implemented by changing digging patterns of the machine 10 to re-distribute the load. Instantaneous analysis of the loading conditions allows operators to correct digging behaviors in real time (active correction), thus reducing the cumulative non-centered loading on the lip 816 and the resultant torque and loading on the bucket 812 and the machine to which the bucket 812 is coupled.

Although the above discussion has been primarily in connection with a load within a bucket and teeth and/or shrouds on a bucket, the monitoring device can be used to create, e.g., a two or three dimensional profile of other products or product surface(s) on a bucket such as wings, and/or runners or the bucket or other earth working equipment attachments and components. Moreover, systems can also be used to monitor the presence and or condition of products on other types of earth working equipment such as runners on chutes or truck trays, or end bits on blades.

The use or other designs of teeth and shrouds are possible (such as two-piece teeth rather than three-piece teeth), as are buckets having only teeth (or predominantly teeth) or only shrouds (or predominantly shrouds), and other earth working equipment with other ground engaging products.

Excavating equipment is intended as a general term to refer to any of a variety of excavating machines used in mining, construction and other activities, and which, for example, include dozers, loaders, dragline machines, cable shovels, face shovels, hydraulic excavators, continuous miners, road headers, shear drums and dredge cutters. Excavating equipment also refers to the ground engaging products of this equipment such as the bucket, blade, drum, or cutter head.

It will now be appreciated that the monitoring device 20, the thermal inserts, or both, may detect a temperature profile of the ground engaging products 14 to detect wear, damage and/or loss of the ground engaging products 14. The temperature profile of the ground engaging products 14 can be compared by a programmable logic device with known profiles in a database to determine the level of wear in the products 14 and/or whether the ground engaging product 14 has separated from the earth working equipment 10. One or more thermal inserts 52, 152, 252 having thermal properties that contrast with the material of the ground engaging products 14 can be included as a thermal reference point and may be used to assist in detecting the wear and/or presence of the ground engaging products 14. The inclusion of an insert(s) 52, 152, 252 helps differentiate the ground engaging products from the base material (e.g., the shroud 32 from the lip 16) on which it is mounted and can be particularly useful for parts that minimally extend from the base such as a shroud 32 on a lip 16.

As described above, the thermal inserts can be integrated into a wear part (such as the shroud or tip) in several ways. For example, the insert(s) may be received in an aperture in the body of the wear part, the inserts may be secured in a location where they are not expected to wear away such as proximate the rear end of the wear part, the inserts may be secured to the lock to detect loss of the wear part, the inserts may be secured in openings in the body of the wear part where wear would be expected and used as sacrificial indicators to detect different levels of wear. Multiple inserts (active, passive, or a combination of both) may be used to determine the level of wear and/or to determine loss of a portion of a wear part, particularly a separable portion.

The thermal insert 52, 152, 252 may be composed of any material that provides contrasting thermal properties to the material of the wear part (such as the point 46, intermediate adapter 42, or shroud 32). The insert 52, 152, 252 could, e.g., be a polymer, tungsten, titanium, nickel, chrome or an alloy of materials. The insert 52, 152, 252 can optionally be a combination of materials that presents to an infrared camera a characteristic image such as a target or a cross or other differentiable image.

It will now also be appreciated that monitoring device can be mounted on earth working equipment or can be separate from the earth working equipment. The monitoring device can be movable. Separating the monitoring device from the earth working equipment can protect the device from vibrations and impact shocks associated with the earth working equipment. The ability to move the monitoring device allows the device to, e.g., improve its ability to monitor the ground engaging products, and/or monitor more than one product or earth working equipment. As examples only, the monitoring device(s) could be secured to the bucket, the earth working machine (e.g., the stick, the boom, or the cab), a drone, a service vehicle (e.g., on a hoist), or the like.

It will now also be appreciated that the monitoring device can be mounted on any convenient mobile vehicle, for example, an ROV, robot, service vehicle or the like, or on a handheld device (for example, a mobile phone, tablet or the like), or on a wearable device (for example, an exoskeleton suit or an augmented reality or virtual reality device).

The thermal imaging sensor may capture an image of at least a portion of the ground engaging product continuously, at set times or event-based (e.g., upon receiving a trigger or issuance of the alert).

A thermal detector may be used instead of a thermal imaging sensor. Signals from the thermal detector may be combined by a local or remote computer to create a map or other useful temperature profile information.

It will now also be appreciated that the monitoring device has been described that can include an infrared detector, thermal camera, or the like, to collect a temperature value of one or more thermal insert(s) 52, 152, 252 and a temperature value of one or more surface points on, for example, a wear part and/or the surrounding environment. Alternatively, or additionally, the monitoring device may detect the temperature profile of the product and that of the surrounding environment (e.g., the earthen material). The data collected by the monitoring device can be transmitted to a remote device, which could be an ECU 304 or other programmable logic device in the cab, service vehicle, office, on a person, or elsewhere that processes the data to determine a temperature differential of measured points (and optionally a thermal map). The temperature differential measured by the monitoring device can indicate other condition issues such as separation of a portion of a tooth (or other wear part) or excessive wear or erosion of a wear part. The monitoring device can collect thermal data from more than two points (or more than two positions or locations) on the ground engaging products 14 (e.g. the teeth 30 or shrouds 32), lip 16, and/or the bucket 12 or runners thereon. The monitoring device, or a remote computing device (such as a cloud computing environment) can create a thermal map of the ground engaging products 14 using multiple thermal data points.

The ground engaging products 14 may be shown on the display device 94 as a generated 3D profile, and/or photographic or video graphic image from an advantageous vantage point. In this way the operator is able to make better informed decisions regarding wear, loss, and replacement of the ground engaging products 14. The display 94, and/or a similarly configured displays, may also be available to other personnel at, associated with, or remote to the worksite.

A UAV may comprise a drone, helicopter, blimp, airplane, or other aerial vehicle. The mobile vehicle may be maneuvered directly by an operator, remotely by an operator via a user input device, or may be maneuvered autonomously, or have programmed autonomous functions (e.g. autonomous landing, autonomous hovering above the earth working equipment, and the like).

In other embodiments, the monitoring device 20, 320 may be mounted on a movable arm, boom, stick, or the like, that is coupled to the earth working machine 10.

The mobile vehicle may be brought to earth working equipment on a transport vehicle that can move from a warehouse, station or first earth working equipment to a second earth working equipment. The transport vehicle may have wheels and/or tracks. The transport vehicle may be driven to the earth working equipment by an operator located within the vehicle but could be driven remotely or autonomously. In another example, the transport vehicle may be fully automated and programmed to drive to the earth working equipment requiring ground engaging products 14 to be monitored. The transport vehicle can also be used for other service activity, or as part of a haul truck fleet. In an alternative embodiment, the mobile vehicle having the monitoring device may be flown or driven to the earth working equipment without the need for a separate transport vehicle to move the tool from location to location.

In some embodiments, data captured or created by the ECU 304 may be coupled with sensor data, and/or data from other sources, and processed by a system that receives feeds from various mining or construction equipment. Multiple antennas and/or remote devices could be used to increase the reliability of signal reception, if desired or needed for the particular operation.

The ECU 304 may have additional components, and it may capture or process data relating to, but not limited to, engine torque, fuel consumption, atmospheric temperature, engine temperature, ambient temperature, and the like.

Relative terms such as front, rear, top, bottom and the like are used for convenience of discussion. The terms front or forward are generally used (unless otherwise stated) to indicate the usual direction of travel of the earthen material relative to the product during use (e.g., while digging), and upper or top are generally used as a reference to the surface over which the material passes when, for example, it is gathered into the bucket. Nevertheless, it is recognized that in the operation of various earth working machines, the ground engaging products may be oriented in various ways and move in all kinds of directions during use.

The above disclosure describes specific examples. The system includes different aspects or features of the invention. The features in one embodiment can be used with features of another embodiment. The examples given, and the combination of features disclosed are not intended to be limiting in the sense that they must be used together.

The monitored ground engaging products can, for example, include shrouds, points, intermediate adapters, runners, and the like. The earth working equipment can include, for example, excavators, loaders, cable shovels, face shovels, draglines, etc.

LIST OF REFERENCE NUMERALS

Earth working machine 10
Bucket 12, 812
Ground engaging products 14, 814
Lip 16, 816
Monitoring device or apparatus 20, 320
Field of view 22, 322
Remote database 24
Cloud computing environment 26
Teeth 30, 830
Shrouds 32, 832
Adapter 40
Adapter nose 41
Intermediate adapter 42
Locks 44
Tip, point 46
Tip upper surface 48
Front end 50
Thermal inserts 52
Passive thermal insert 52a
Active thermal insert 52b
Intermediate adapter front face 54
Tip cavity 56
Shroud upper leg 60
Shroud lower leg 62
Rearward cavity 64
Shroud aperture 66
Upper rear edge 68
Insert apertures 72a,b,c,d
Upper target area 74
Threaded stud 76
Shroud front edge 78
Controller 80
Thermal imaging sensor 82
High definition camera 83
Wireless transceiver 84
Local power source (battery) 86
Thermal map algorithm 88
Earth working machine cab 90
Steering wheel 92
Display device (tablet) 94
Controls and alerts 96
Thermal map 100
Tooth and shroud outline 102
Shroud boundary line 104
Tooth insert marker 106
Tip thermal insert pixels 110
Shroud front pixels 112
Shroud second to front pixels 114
Shroud rear side pixels 116
Shroud rear central pixels 118
Folding lock 120
Lock opening 122
First interlocking component 124
Second interlocking component 126
Circular threaded passage 128
Lock retainer 130
Lock upper surface 132
Lock thermal insert 152
Thermal insert cap portion 154
Thermal insert stem portion 156
Lock 244
Active thermal insert 252
Lock cap 260
Lock pin 262
Protruding threads 264
Latch 266
Upper (or outer) end 268
Tool receiving formation 270
Collar 272

Collar threaded bore 274
Upper thermal surface 278
Rechargeable power source 280
Thermal unit 282
Thermal emitter 284
Accelerometer 286
Controller 288
Transceiver 290
Temperature sensor 292
Charging unit (piezoelectric components) 294
Monitoring system 300
Unmanned Aerial Vehicle (UAV) 302
Equipment Control Unit (ECU) 304
Monitoring device 320
Thermal imaging sensor 321
Field of view 322
Adjustable stage 324
Communication module 334
Antenna 336
Attenuation characterization module 338
Tether 358
ECU housing 402
Display 404
UAV physical controls 406
Display driver module 408
UAV navigation module 410
Power supply 412
Wireless communication module 414
ECU antenna 416
Processor 418
Storage 420
ECU screen 430
Thermal map 500
Temperature information screen portion 502
Intermediate adapter thermal pixels 510
Tip thermal pixels 512
Tip insert marker 514
Insert identification information 520
Insert temperature (T1) 522
Non-insert temperature (T2) 524
Temperature differential (ΔT) 526
Adapter 540
Adapter nose 541
Intermediate adapter 542
Tip 546
Tip thermal insert recess 550
Intermediate adapter front face 554
Tip rear cavity 556
Intermediate adapter rear recess 560
Adapter nose thermal insert 652
Intermediate adapter front thermal insert 752
Graph 900

The invention claimed is:

1. A method of ascertaining a characteristic of a ground engaging product on earth working equipment, the method comprising the steps of: (i) measuring a temperature at a plurality of different locations on or near the earth working equipment, including at least one location on the ground engaging product; (ii) identifying presence or absence of areas of temperature contrast near a location of an expected thermal insert; and (iii) indicating a characteristic of the ground engaging product based on the identified areas.

2. A method according to claim 1, further comprising using the measured temperatures to create a thermal map of at least part of the ground engaging product.

3. A method according to claim 1, wherein identifying presence or absence of areas of temperature contrast near a location of an expected thermal insert includes using one or more markers or other indicators to align with areas of expected temperature contrast.

4. A method according to claim 3, wherein the one or more markers or other indicators are overlaid on a thermal map to highlight areas of expected temperature contrast.

5. A method according to claim 1, wherein indicating a characteristic of the ground engaging product based on the identified areas includes classifying an amount of wear on the ground engaging product into a plurality of categories.

6. A method according to claim 5, further comprising generating an alert when the wear exceeds a defined classification level.

7. Monitoring apparatus for detecting a characteristic of a ground engaging product on earth working equipment, the monitoring apparatus comprising:
a thermal detector operable to measure a temperature at a plurality of different locations on or near the earth working equipment, including at least one location on the ground engaging product; and
a processor operable to (i) identify presence or absence of areas of temperature contrast near a location of an expected thermal insert, and (ii) identify a characteristic of the ground engaging product based on the identified areas.

8. Monitoring apparatus according to claim 7, further comprising a plurality of thermal detectors, each coupled to the processor.

9. Monitoring apparatus according to claim 8, wherein a plurality of the thermal detectors are directed at different parts of the ground engaging product.

10. Monitoring apparatus for detecting a characteristic of a ground engaging product on earth working equipment, the monitoring apparatus comprising:
a thermal detector operable to measure a temperature at a plurality of different locations on or near the earth working equipment, including at least one location on the ground engaging product, and
a processor operable to identify presence or absence of areas of temperature contrast near or at a location of the ground engaging product to identify a characteristic of the ground engaging product based on the identified areas.

11. Monitoring apparatus according to claim 10, wherein the processor is further operable to identify presence or absence of areas of temperature contrast by comparing measurements of a current thermal image of the ground engaging product with measurements of a previously recorded thermal image of the ground engaging product, and detecting any reduction in size of part of the ground engaging product.

12. Monitoring apparatus according to claim 11, wherein the monitoring apparatus comprises a plurality of thermal detectors, each thermal detector being coupled to the processor, and directed towards different parts of the ground engaging product.

* * * * *